United States Patent
Huey et al.

(10) Patent No.: US 9,900,219 B2
(45) Date of Patent: Feb. 20, 2018

(54) ACTIVE PANEL DEMARCATION

(71) Applicant: Equinix, Inc., Redwood City, CA (US)

(72) Inventors: Robert J. Huey, Pleasanton, CA (US); Jared Newell, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 14/868,177

(22) Filed: Sep. 28, 2015

(65) Prior Publication Data

US 2016/0344590 A1 Nov. 24, 2016

Related U.S. Application Data

(60) Provisional application No. 62/164,965, filed on May 21, 2015.

(51) Int. Cl.
*H04L 12/24* (2006.01)
*H04L 12/933* (2013.01)
*H04Q 11/00* (2006.01)
*H04Q 1/02* (2006.01)

(52) U.S. Cl.
CPC .......... *H04L 41/0893* (2013.01); *H04L 49/10* (2013.01); *H04Q 1/13* (2013.01); *H04Q 11/0071* (2013.01); *H04Q 2011/0079* (2013.01)

(58) Field of Classification Search
CPC ....... H04Q 11/0071; H04Q 2011/0079; H04Q 1/13; H04Q 11/0005; H04Q 2011/0039; H04Q 11/0062; H04Q 2011/0052; H04Q 2011/0015; H04L 41/0893; H04L 49/10
See application file for complete search history.

(56) References Cited

U.S. PATENT DOCUMENTS

| | | | |
|---|---|---|---|
| 8,379,656 B2 | 2/2013 | Waldrop et al. | |
| 8,537,845 B2 | 9/2013 | Waldrop et al. | |
| 8,650,805 B1 * | 2/2014 | Poleshuk | H04Q 1/025 312/223.6 |
| 2008/0141056 A1 | 6/2008 | Abughazaleh et al. | |

(Continued)

OTHER PUBLICATIONS

U.S. Appl. No. 62/149,374, filed Apr. 17, 2015 entitled "Cloud-Based Services Exchange", 58 pgs.

(Continued)

*Primary Examiner* — Ted Wang
(74) *Attorney, Agent, or Firm* — Shumaker & Sieffert, P.A.

(57) ABSTRACT

In general, this disclosure describes a configurable cable patch panel, or "active panel," that serves as a demarcation point between a customer area of a communication facility and a provider area of the communication facility. As described herein, the active panel may be dynamically configured to interconnect existing customer-side and provider-side connections to active panel ports in order to facilitate on-demand virtual connections within the communication facility between facility customers and/or between a facility customer and communication facility services. In some examples, a programmable network platform for the communication facility exposes a collection of interfaces by which customers may request virtual connections, which the programmable network platform provisions, in part, by configuring the active panel to interconnect select customer-side ports of the active panel with select provider-side ports of the active panel.

26 Claims, 17 Drawing Sheets

(56) References Cited

U.S. PATENT DOCUMENTS

2009/0178119 A1   7/2009  Macauley
2011/0038382 A1   2/2011  Peterson et al.

OTHER PUBLICATIONS

U.S. Appl. No. 62/072,976, filed Oct. 30, 2014 and entitled "Interconnection Platform For Real-Time Configuration and Management of a Cloud-Based Services Exchange", 104 pgs.
U.S. Appl. No. 62/160,547, filed May 12, 2015 and entitled "Programmable Network Platform for a Cloud-Based Services Exchange", 115 pgs.
U.S. Appl. No. 61/285,371, filed Dec. 10, 2009 and entitled "Ethernet Exchange", 65 pgs.
U.S. Appl. No. 61/239,997, filed Sep. 4, 2009 and entitled "Private Network Connectivity Platform", 68 pgs.
U.S. Appl. No. 61/323,066, filed Apr. 12, 2010 and entitled "Ethernet Exchange", 115 pgs.
International Search Report and Written Opinion of International Application No. PCT/US2016/033001, dated Oct. 17, 2016, 12 pp.
Office Action and Examination Search Report from counterpart Canadian Application No. 2,951,947 dated Jul. 24, 2017, 4 pp.
Examination Report from counterpart Australian Application No. 2016264125 dated Aug. 31, 2017, 3 pp.
Response to Communication Pursuant to Rules 161(1) and 162 EPC dated Jan. 20, 2017 from counterpart European Application No. 16744924.8, filed Jul. 5, 2017, 10 pp.
International Preliminary Report on Patentability issued in International Application No. PCT/US2016/033001 dated Nov. 30, 2017, 8 pp.

\* cited by examiner

ACTIVE PANEL DEMARCATION

This application claims the benefit of U.S. Provisional Patent Application 62/164,965, filed May 21, 2015, the entire content of which is incorporated herein by reference.

TECHNICAL FIELD

The invention relates to computer networks and, more specifically, to interconnecting computer networks.

BACKGROUND

A network services exchange provider or co-location provider (a "provider") may employ a communication facility, such as a data center or warehouse, in which multiple customers of the provider locate network, server, and storage gear and interconnect to a variety of telecommunications and other network service provider(s) with a minimum of cost and complexity. Data centers may be shared by the multiple customers. With IT and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

SUMMARY

In general, this disclosure describes a configurable cable patch panel, or "active panel," that serves as a demarcation point between a customer area of a communication facility and a provider area of the communication facility. As described herein, the active panel may be dynamically configured to interconnect existing customer-side and provider-side connections to active panel ports in order to facilitate on-demand virtual connections within the communication facility between facility customers and/or between a facility customer and communication facility services. In some examples, a programmable network platform for the communication facility exposes a collection of interfaces by which customers may request virtual connections, which the programmable network platform provisions, in part, by configuring the active panel to interconnect select customer-side ports of the active panel with select provider-side ports of the active panel.

The active panel may in this way facilitate the pooling of physical resources while abstracting individual active panel port assignments from services, which may permit the virtualization of interconnection services by the facility provider using, e.g., the programmable network platform. In other words, by decoupling the one-to-one or one-to-many dedicated connections between provider-side and customer-side ports, the active panel permits the physically pre-provisioned cross-connect infrastructure of the communication facility (representing a pool of interconnect capacity from/to the active panel) to be dynamically selected, configured, and used on-demand by the customers. For example, individual circuits made available by the facility and connected to the provider-side ports of the active panel may be dynamically 'pooled' or 'aggregated' into higher capacity interconnects or left isolated to provide dedicated capacity via configurable, logical interconnections within the active panel to customer-side ports. The active panel may thus improve provisioning speed for interconnects by reducing the need for manual installation or modification of physical cabling, may allow the customer to create both physical and logical circuits across the communication facility to providers and provider services of the customer's choosing, and may enable dynamic bundling of physical cables to create aggregation groups on demand. Moreover, dynamic configuration of the active panel may improve security by reducing the need for agents of the communication facility provider/operator to enter customer cages in order to configure interconnections.

In some examples, a cable patch panel comprises a software-configurable network interface device having a first side, a second side, a switch, and a configuration interface, the first side comprising a first plurality of network interface ports accessible only to a communication facility provider for a communication facility having an infrastructure network configured to interconnect a plurality of customer networks, the second side comprising a second plurality of network interface ports accessible only to a customer of the communication facility provider, and the configuration interface configured to, in response to receiving configuration data defining a connection between at least one port of the first plurality of network interface ports and at least one port of the second plurality of network interface ports, configure the switch to create the connection between the at least one port of the first plurality of network interface ports and the at least one port of the second plurality of network interface ports.

In some examples, a cage structure of a communication facility comprises a cage enclosure having at least one panel demarcating a customer area and a provider area, the cage enclosure enclosing the customer area accessible only to a customer of the communication facility provider; and a cable patch panel situated within the at least one panel comprising: a software-configurable network interface device having a first side, a second side, a switch, and a configuration interface, the first side comprising a first plurality of network interface ports accessible only to a communication facility provider for a communication facility having an infrastructure network configured to interconnect a plurality of customer networks, and the second side comprising a second plurality of network interface ports accessible only to the customer of the communication facility provider having access to the area enclosed by the cage enclosure, and the configuration interface configured to, in response to receiving configuration data defining a connection between at least one port of the first plurality of network interface ports and at least one port of the second plurality of network interface ports, configure the switch to create the connection between the at least one port of the first plurality of network interface ports and the at least one port of the second plurality of network interface ports.

In some examples, a method comprises receiving, by a configuration interface of a software-configurable network interface device of a cable patch panel, configuration data defining a connection between at least one port of the first plurality of network interface ports and at least one port of the second plurality of network interface ports, wherein the software-configurable network interface device includes a first side, a second side, and a switch, wherein the first side comprises a first plurality of network interface ports accessible only to a communication facility provider for a communication facility having an infrastructure network configured to interconnect a plurality of customer networks, and wherein the second side comprises a second plurality of network interface ports accessible only to a customer of the communication facility provider, configuring, by the configuration interface in response to the receiving, the switch to create the connection between the at least one port of the first plurality of network interface ports and the at least one port of the second plurality of network interface ports.

In some examples, a method comprises providing, by a programmable network platform (PNP), a software interface to receive service requests for configuration of interconnection services within network infrastructure of one or more network data centers that are controlled by the PNP and administered by a communication facility provider; receiving, by the PNP and via the software interface, a service request to configure an interconnection service within the network infrastructure of the one or more network data centers, wherein the network infrastructure within the one or more network data centers connect through one or more switching fabrics of the one or more network data centers; generating, by the PNP and based on the service request, configuration data defining a connection between at least one port of the first plurality of network interface ports of a cable patch panel and at least one port of the second plurality of network interface ports of the cable patch panel; and sending, by the PNP, the configuration data to the cable patch panel.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

In general, this disclosure describes active panel demarcation in which a dynamic, user-controllable/configurable active patch panel (or "active panel") facilitates dynamic interconnectivity among customers and providers having a presence within a network interconnection infrastructure of a communication facility. The active panel may be employed as a network interface device (NID) within a customer cage mesh to provide on-demand service delivery within the communication facility (and in some cases to other such facilities proximal to the communication facility, e.g. within a metropolitan area), as well as cloud-ready infrastructure for enabling the rapid creation, updating, and deletion of cloud services connectivity to enterprise customers, for instance. By employing the active panel as described herein, the communication facility provider may reduce and in some cases eliminate media conversion between photonic and Ethernet packetized signals; per media-type port reservations and provisioning; patch panel assignments, tracking, and reservations; and physically running and connecting Ethernet or optical cables, e.g., between customer cages for each new/updated interconnect.

Figure 1:
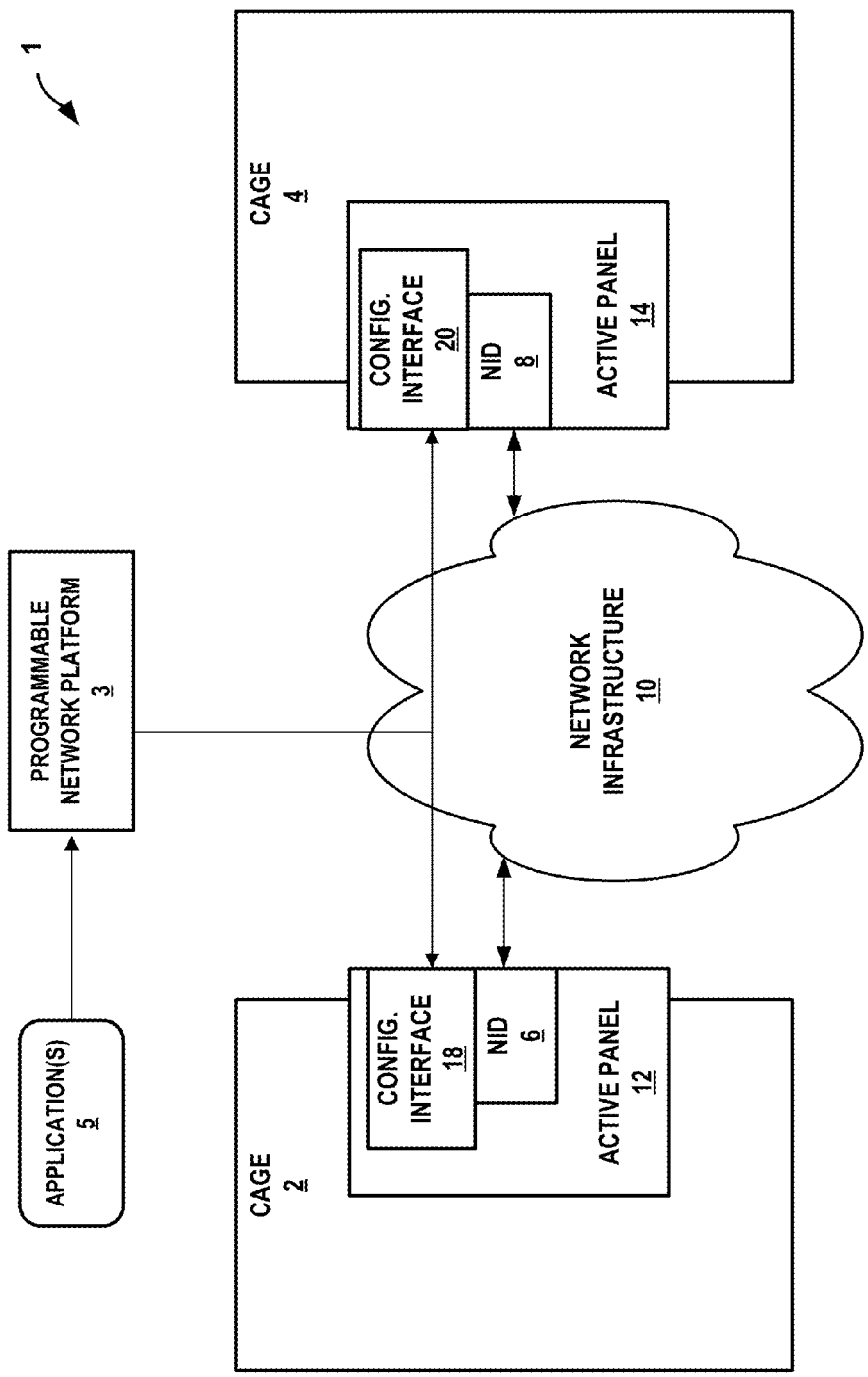
FIG. 1 is a block diagram that illustrates a high-level view of a system that provides an operating environment for a programmable network platform that administers, at least in part, connectivity for a network infrastructure and active panels to interconnect cages, in accordance with techniques described herein.

FIG. 1 is a block diagram that illustrates a high-level view of a system 1 that provides an operating environment for a programmable network platform that administers, at least in part, connectivity for network infrastructure 10 and active panels 12 and 14 to interconnect cages 2 and 4, in accordance with techniques described herein. In some cases, system 1 represents a cloud-based services exchange that interconnects cloud service providers (CSPs) to customers of the cloud-based services exchange at layer 3. In some aspects, system 1 represents an Ethernet exchange that interconnects customers of the Ethernet exchange.

Network infrastructure 10 includes layer 3 (L3) and layer 2 (L2) forwarding elements, which may include one or more routers, switches, and other L3/L2 forwarding devices. Network infrastructure 10 may further include one or more real servers that offer one or more compute/computing farms by which the network infrastructure 10 may offer services to customers associated with cages 2, 4 and/or apply services to service traffic. Network infrastructure 10 allows respective active panels 12, 14 of cages 2 and 4 associated with, e.g., a carrier/NSP, cloud service provider, or cloud customer, to be directly cross-connected via a provisioned virtual connection between ports of active panels 12, 14 to each other, or to any other cage, thereby allowing direct exchange of network traffic among the customer networks, carrier networks, and cloud service providers networks.

Cages 2 and 4 are installed by the system 1 provider and provide a secure structure and location for a customer, carrier, or cloud service provider to store and access their systems, while also having access to network infrastructure 10 via a customer-side of active panels 12 and 14. Cages 2 and 4 may also provide the system 1 provider with convenient and secure access to a provider-side of active panels 12 and 14. For example, the provider may be able to access the respective provider-sides of active panels 12 and 14 without accessing the interior of cages 2 and 4, where the customer-side of active panels 12 and 14 may be located. Likewise, the customers leasing or otherwise having access to the interiors of cages 2, 4 may be able to access the respective customer-sides of active panels 12, 14, but may be prevented from accessing the provider-sides of active panels 12, 14. In some examples, the provider may able to access a secure hallway between cages 2 and 4, which may allow access to the provider-side active panels 12 and 14.

Active panels 12 and 14 are installed by the provider in respective cages 2 and 4 and provide a secure structure and location for the customer, carrier, or cloud service provider to connect their networks and/or systems to network infrastructure 10 via customer ports on the customer-side of respective active panels 12 and 14. Active panels 12 and 14 may also provide a secure structure and location for the provider to connect the networks and/or systems of the customer, carrier, or cloud service provider to network infrastructure 10 via provider ports on the provider-side of respective active panels 12 and 14. As described herein, active panels 12 and 14 may enable automation of the connection between the systems of the customer, carrier, or cloud service provider to network infrastructure 10 and hence to each other via provisioned virtual connections between the customer ports and the provider ports of active panel 12 or via provisioned virtual connections between the customer ports and the provider ports of active panel 14.

Network interface devices (NIDs) 6, 8 of respective active panels 12, 14 include a collection of network interfaces or ports and may be configured according to techniques described herein to dynamically create, update, or delete connections between select provider-side ports and select customer-side ports (or, more simply, "customer ports") of the NID. More specifically, NIDs 6 and 8 may allow for remote and on-demand provisioning by controller 3 via a configuration interface exposed by the NIDs. In some examples, NIDs 6 and 8 may allow for direct provisioning by the provider at the provider-side of active panels 12 and 14.

In some examples, active panel 12 may be configured to enable a customer to access cloud services offered by cloud service providers (CSPs) or carriers via network infrastructure 10 from a customer-side port of NID 6 dynamically coupled to a provider-side port (or, more simply, "provider port") of NID 6. Cage 2 may also be used by the customer to access another cage used by the customer via network infrastructure 10 and a provisioned customer-side port to the provider port with one or more virtual connections of NID 6.

In some examples, active panel 14 may be used by a network service provider (NSP) that is associated with a transit network by which network subscribers of the NSP access cloud services offered by cloud service providers (CSPs) via network infrastructure 10 and a provisioned NSP port to the provider ports with one or more dynamically-configured connections within NID 8. In general, customers of CSPs may include network carriers, large enterprises, managed service providers (MSPs), as well as Software-as-a-Service (SaaS), Platform-aaS (Paas), Infrastructure-aaS (IaaS), Virtualization-aaS (VaaS), and data Storage-aaS (dSaaS) customers for such cloud-based services as are offered by the CSPs via network infrastructure 10.

In this way, network infrastructure 10 and active panels 12 and 14 streamline and simplify the process of partnering CSPs and customers (via carriers or directly) in a secure and convenient manner. One example application of network infrastructure 10 and active panels 12 and 14 may be a co-location and interconnecting data center in which CSPs, carriers, and/or customers may already have network presence. In this example, one or more customer ports may be dynamically connected to one or more provider ports within respective active panels 12, 14, which may allow for interconnection within the data center via network infrastructure 10. In other words, network infrastructure 10 and active panels 12 and 14 may allow for the participating carriers, customers, and CSPs to have a wide range of interconnectivity options in the same facility.

System 1 includes programmable network platform (PNP) 3, alternatively referred to herein as an "interconnection platform." Programmable network platform 3 may expose a software interface that defines the methods, fields, and/or other software primitives by which application(s) 5 may invoke PNP 3 to provision one or more virtual connections between cages 2, 4. In this way, the interface to PNP 3 allow customers, carriers, and CSPs programmable access to capabilities and assets of network infrastructure 10 by connecting customer ports to provider ports of active panels 12, 14 in order to establish one or more connections to network infrastructure 10 that is physically connected to the provider ports. By also provisioning a virtual connection within network infrastructure 10, PNP 3 is able to interconnect customer ports of NID 6 and customer ports of NID 8. In this way, the end-to-end path setup between specific customer ports of NIDs 6, 8 may be performed on-the-fly and may allow the system 1 provider to avoid having to manually patch network infrastructure 10 cabling to particular provider ports of the NIDs 6, 8 in order to establish connectivity for an interconnection service. Moreover, this end-to-end path setup may be performed despite the system 1 provider not having access to any of the customer ports of the NIDs 6, 8 that are securely located within respective cages 2, 4.

Application(s) 5 represents at least one application that invokes programmable network platform 3 to provision an interconnection service within network infrastructure 10 to dynamically establish connectivity between customer ports of NIDs 6 and customer ports of NID 8. Application(s) 5 represent client-side software for interfacing with the programmable network platform 3 and may include a customer portal, customer applications, a system 1 provider application, a console such as a command-line interface or graphical user interface, and/or a provider-developed application. Users/clients may include enterprise customers, the system 1 provider, and cloud service providers, for instance.

Programmable network platform 3 may represent an application executing within one or more data centers of system 1 or alternatively, off-site at a back office or branch of the system 1 provider (for instance). Although shown as administering a single communication facility, programmable network platform 3 may control service provisioning for multiple different interconnection facilities. Alternatively or additionally, multiple separate instances of the programmable network platform 3 may control service provisioning for respective multiple different interconnection facilities.

Programmable network platform 3 may provide an extensible software interface framework that allows software developers associated with the customers of network infrastructure 10, including enterprise, NSP, and other service providers, to create software applications that allow and leverage access to the programmable network platform by which the applications may request that the customer ports of an active panel be provisioned to provider ports of the active panel in order to establish connectivity and obtain interconnection and other services from network infrastructure 10.

As further described herein, PNP 3 invokes configuration interfaces 18, 20 of respective active panels 12, 14 to enable dynamic and on-demand provisioning of virtual connections between customer ports and provider ports within an active panel and by extension between customer ports in active panel 12 and customer ports in active panel 14, thus and allowing for the end-to-end path interconnection of customer and service provider networks in network infrastructure 10, or between customer networks for the same customer located in different cages. In this way, programmable network platform 3 and the one or more virtual connections of NIDs 6 and 8 may enable the automation of aspects of services provisioning. For example, the configuration interfaces 18, 20 may provide an automated and seamless way for customers to provision customer ports to provider ports of an active panel.

Each of configuration interfaces 18, 20 may represent an application programming interface (API) that defines the methods, fields, and/or other software primitives by which PNP 3 may modify a configuration of the corresponding active panel. Configuration interface 18, for example, may be invoked by an application (e.g., PNP 3) to create, modify, or remove a connection between any customer port of the active panel 12 and any provider port of the active panel 12, such that packets received at a customer port are switched by the NID 6 to the associated provider port, and vice-versa. Configuration interface 18 may further enable PNP 3 to determine a current configuration of the active panel 12. Further, customer ports of the active panel 12 may be configured as part of a virtual local area network (VLAN) or VxLAN for a customer network within cage 2 and associated with one or more provider ports of the active panel 12 such that VLAN traffic received at the customer port is switched out of the associated provider ports for forwarding within the network infrastructure 10, e.g., according to an interconnection service provided by the system 1 provider (also referred to herein as an "interconnection service provider"). Interconnection services may include, e.g., layer 2 services such as Virtual Private LAN Services (VPLS), E-LINES, or other layer 2 virtual connections/virtual private networks; layer 3 services such as an L3 virtual private networks (L3VPNs); and one or more connectivity services provided in an OSI or TCP/IP layer that is greater than L3, such as Application, Presentation, Session, and Transport layer services ("L3+ services").

As further described herein, NIDs 6 and 8 of respective active panels 12 and 14 may also provide direct provisioning of virtual connections between customer and provider ports in active panels 12, 14 for interconnecting customer and cloud service provider networks. In this way, the one or more virtual connections of NIDs 6 and 8 may enable the automation of aspects of cloud services provisioning. For example, active panels 12 and 14 may provide the provider direct and secure access to NIDs 6 and 8, which may enable a secure and automated way for the provider to provision customer and provider ports of an active panel, that is, establish, de-install and manage provisioned ports of active panels 12, 14 and interconnection with multiple, different cloud providers participating in network infrastructure 10. In this example, direct access to NIDs 6 and 8 and the automated way for the provider to provision ports of an active panel may eliminate the need for the provider to provision the active panels 12, 14 with physical cross-connects and Ethernet or optical cable runs.

In some examples, access panels on the provider/corridor side of active panels 12, 14 are associated with security devices that prevent access to the provider ports to those parties not having the appropriate credentials, token, or key, for instance. The security devices may include a lock, a recognition device, a key card access device, a keypad access device, or other security device.

In some examples, active panels 12, 14 represent a pool of interconnect capacity that can be selected, configured and used on-demand by the customer. Individual virtual connections of NIDs 6 and 8 may be dynamically "pooled" into higher capacity interconnects or left isolated to provide dedicated capacity (similar to manual provisioning services). In other words, active panels 12, 14 enable a customer to dynamically adjust bandwidth capacity and increase provisioning speed. For example, a customer agent using programmable network platform 3 may bundle, on-demand, physical cables together creating aggregation groups. Additionally or alternatively, in another example, a customer using programmable network platform 3 may create both physical and logical circuits across network infrastructure 10 to access cloud service providers on-demand. Additionally or alternatively, in another example, a customer may use programmable network platform 3 to decrease the amount of time required to provision services. In this example, the decrease in the amount of time required to provision service may be from avoiding manual installation of physical cabling by pre-installing the physical cabling for network infrastructure 10 to active panels 12, 14. On-demand service provisioning may also improve security of the cages 2, 4 by reducing the need for agents the communication facility provider/operator to enter customer cages to patch cables to the customer-side ports accessible from the inside of the customer cages, configure the patch panel, or otherwise set up interconnections.

In some examples, NIDs 6, 8 of active panels 12, 14 may use an already available power source. For example, NIDs 6, 8 may use a low voltage DC power system that is already configured to provide power to cameras and bio-metric hand scanners in cages 2, 4 and/or throughout a data center.

In this way, each of active panels 12, 14 is a virtualized universal service access point to which customers can connect and consume interconnect services on-demand, without manual intervention by the system 1 provider. For instance, the active panel 12 enclosure and NID 6, including a configurable switch for switching packets between provider ports (including, e.g., uplink transceivers) and customer ports, may be coupled to fiber optic cables of network infrastructure. Collectively, these make up the active panel 12 which represents a pool of interconnect capacity that can be consumed on-demand by the cage 2 customer by creating local physical interconnects to the active panel 12 within cage 2 (i.e., no system 1 provider intervention is required within the customer cage 2) and requesting interconnect services on-demand through application(s) 5. The size of the switch, the uplink capacity and the fiber counts can all vary in size based on the size of the customer cage 2 and expected demand. The active panel may be installed at the time a cage is built and have dimensionality that conforms to manually provisioned in-cage mesh patch panels, in some examples.

Figure 2:
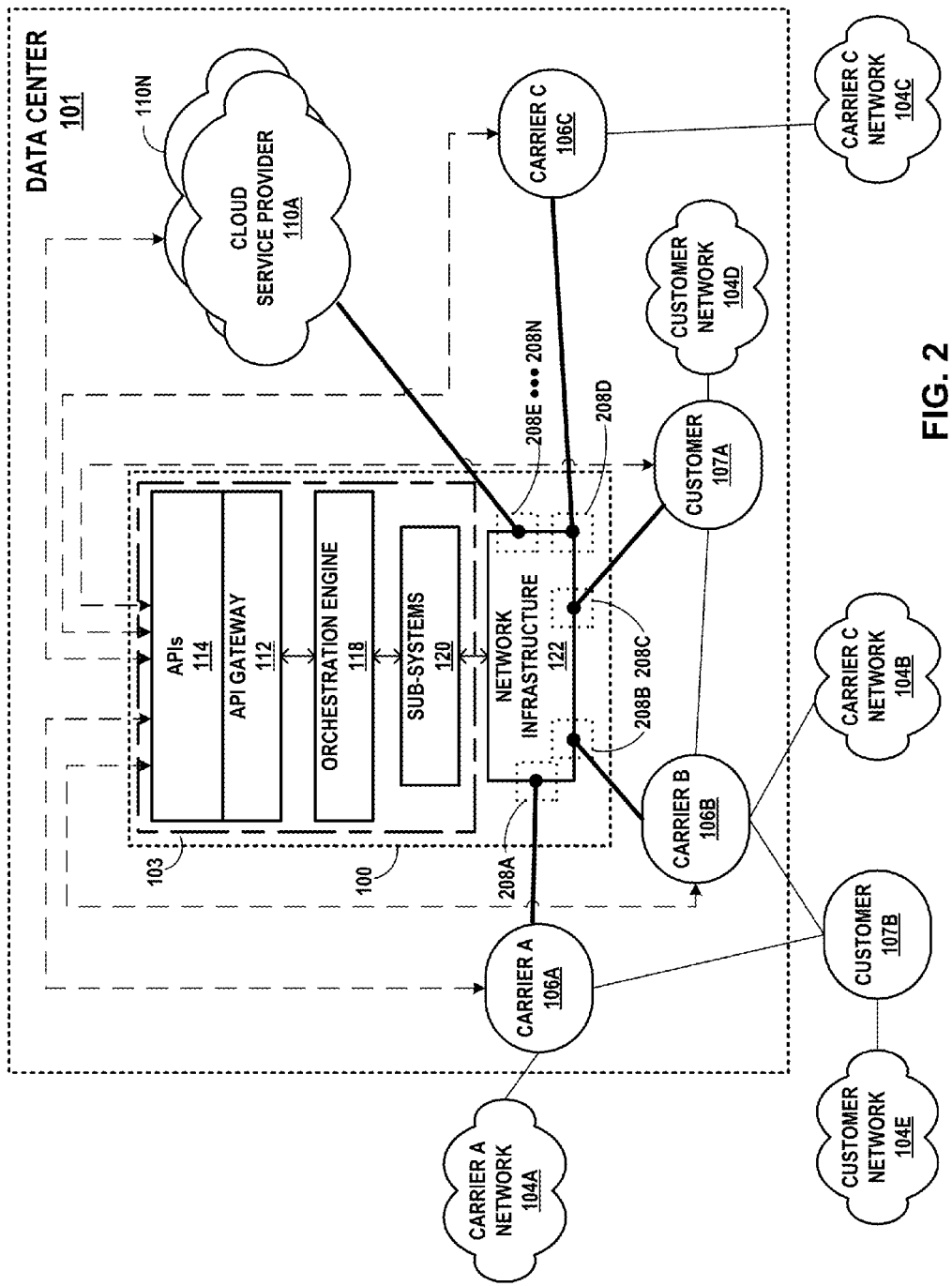
FIG. 2 is a block diagram that illustrates a high-level view of a data center that provides an operating environment for a communication facility, in accordance with techniques described herein.

FIG. 2 is a block diagram that illustrates a high-level view of data center 101 that provides an operating environment for communication facility 100, in accordance with techniques described herein. In the example of FIG. 2, data center or "communication facility" 101 may include communication facility 100, programmable network platform 103, and active panels 208A-208N (collectively "active panels 208"), which may correspond to network infrastructure 10, programmable network platform 3, and active panels 12 and 14 as described in FIG. 1.

In some examples, communication facility 100 allows a corresponding one of customer networks 104D, 104E and carrier networks 104A-104C (collectively, "private networks 104") of any carriers 106A-106C (collectively, "carriers 106") or other cloud customers including customers 107A, 107B to be directly cross-connected, via active panels 208A-208N to any other customer network and/or to any of cloud service providers 110A-110N (collectively, "CSPs 110"), thereby allowing direct exchange of network traffic among the customer networks and CSPs 110.

Carriers 106 may each represent a network service provider that is associated with a transit network by which network subscribers of the carrier 106 may access cloud services offered by CSPs 110 via the communication facility 100. In general, customers of CSPs 110 may include network carriers, large enterprises, managed service providers (MSPS), as well as Software-as-a-Service (SaaS), Platform-aaS (Paas), Infrastructure-aaS (IaaS), Virtualization-aaS (VaaS), and data Storage-aaS (dSaaS) customers for such cloud-based services as are offered by the CSPs 110 via the communication facility 100.

Active panels 208 may each represent an active demarcation panel between carriers 106, customers 107A, 107B, and CSPs 110 and the provider of network infrastructure 122, also referred to herein as a "cloud exchange provider" in aspects of data center 101 that include a cloud exchange point. Communication facility 100 of data center 101 includes network infrastructure 122 that provides a L2/L3 switching fabric by which CSPs 110 and customers/carriers interconnect via a switching module of active panels 208. This enables a carrier/customer to have options to create many interconnections with only a one-time hook up to an active panel and provisioning of the switching module of the active panel with programmable network platform 103 of communication facility 100. In other words, instead of having to establish separate connections across transit networks to access different cloud service providers or different cloud services of one or more cloud service providers, communication facility 100 allows customers to interconnect to multiple CSPs and cloud services using active panels 208 and network infrastructure 122 within data center 101.

In some examples, APIs 114 facilitate machine-to-machine communication to enable dynamic and on-demand provisioning of virtual connections in the metro-wide infrastructure for interconnecting customer and provider networks. In this way, programmable network platform 103 enables the automation of aspects of cloud services provisioning. For example, the software interfaces may provide an automated and seamless way for customers to establish, de-install and manage provisioned ports of active panels 208 and interconnection with multiple, different cloud providers participating in the cloud exchange.

In some examples, communication facility 100 includes an API gateway 112 having one or more processors that executes one or more applications that expose software interfaces defined according to APIs 114. The applications may invoke services that correspond to endpoints of the APIs 114, and the services may themselves invoke the programmable network platform service of orchestration engine 118. API gateway 112 may execute on a management device such as one or virtual machines and/or real servers of data center 101. Although shown as a single element in FIG. 2, API gateway 112 may comprise a cluster of one or more physical and/or virtual computing machines executing on one or more physical processors.

In some examples, cloud exchange includes an orchestration engine 118 that organizes, directs and integrates underlying software sub-systems 120 for managing various aspects of interconnection within the network infrastructure 122 including provisioning of active panels 208 as well as cloud services management. The orchestration engine 118 may, for example, provide a rule-drive workflow engine that operates between the APIs 114 and the underlying programmable network platform of communication facility 100 that includes sub-systems 120 and network infrastructure 122. In this way, the orchestration engine 118 can be used by customer-proprietary applications and the APIs 114 for direct participation with programmable network platform 103 of the communication facility 100. In other words, the orchestration engine 118 offers a "programmable network platform service" having various application engines to handle the API gateway 112 service requests.

As described in further detail below, sub-systems 120 may offer "provisioning services" invokable by orchestration engine 118. Sub-systems 120 and orchestration engine 118 may each be centralized or distributed applications and may execute on a management device such as one or virtual machines and/or real servers of data center 101.

Network infrastructure 122 represents the switching fabric of communication facility 100 connected to the provider ports of active panels 208 that may be dynamically provisioned to customer ports with virtual connections by invoking APIs 114 according to techniques described herein. Each of the customer ports of active panels 208 that may be dynamically provisioned is associated with one of carriers 106, customers 107, and CSPs 110.

Figure 3:
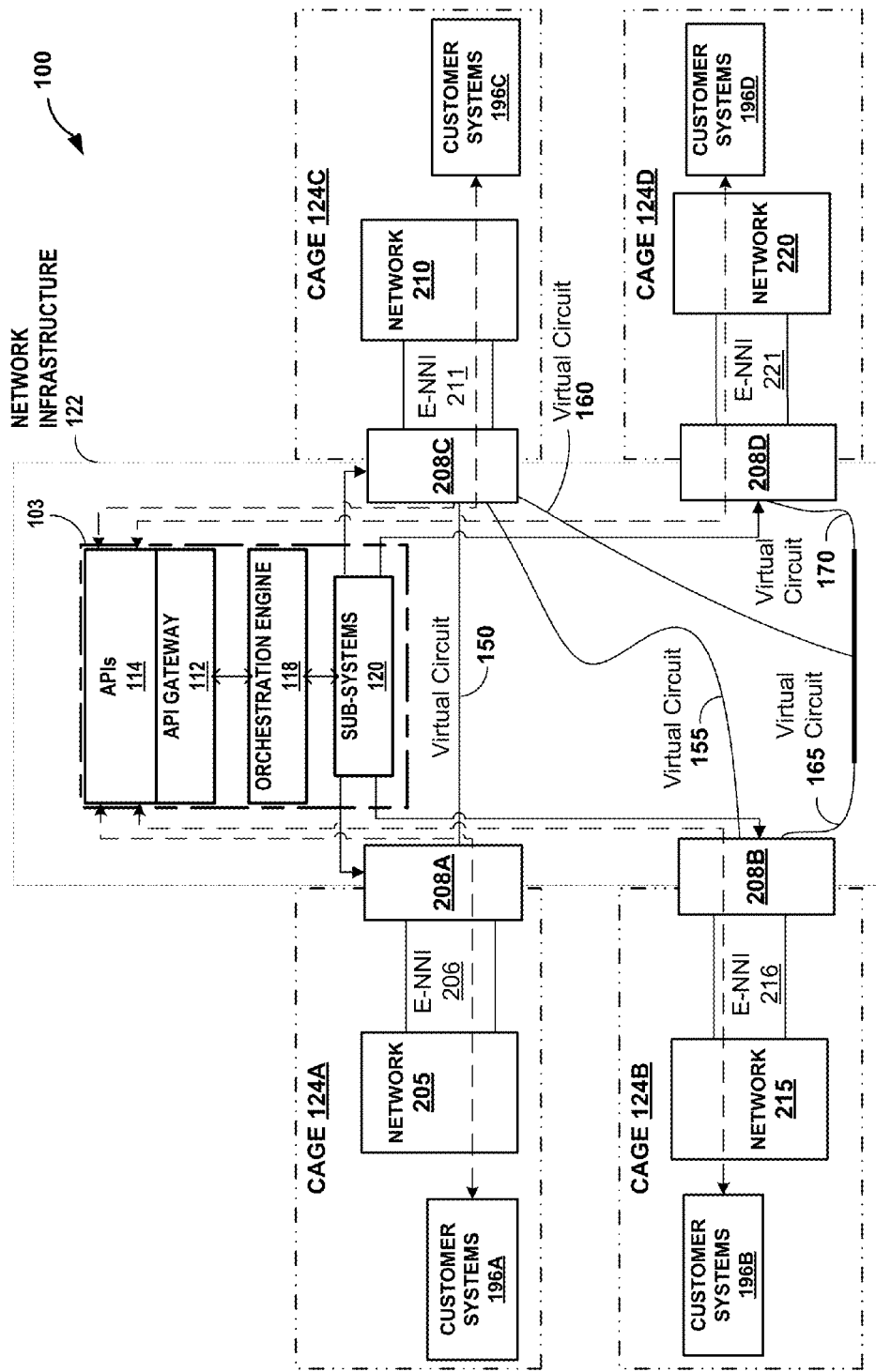
FIG. 3 is a block diagram illustrating an example of a plurality of active panels managed by a programmable network platform of a communication facility to provide cross-connect availability between cages, in accordance with techniques described herein.

FIG. 3 is a block diagram illustrating an example of a plurality of active panels 208 managed by programmable network platform 103 of communication facility 100 to provide cross-connect availability between cages 124, in accordance with techniques described herein. In this example, communication facility 100 provides active panels 208A-208D (collectively "active panels 208") of respective cages 124A-124D (collectively "cages 124") and programmable network platform 103. In the example of FIG. 3, communication facility 100 may include network infrastructure 122, programmable network platform 103, cages 124A-124D (collectively "cages 124"), and active panels 208A-208D (collectively "active panels 208"), which may correspond to network infrastructure 10, programmable network platform 3, cages 2 and 4, and active panels 12 and 14 as described in FIG. 1.

In the example of FIG. 3, programmable network platform 103 may allow for provisioning customer ports to provider ports of active panels 208 in order to access virtual circuits 150, 155, 160, 165, 170 for cross-connecting carrier networks 205, 210, 215 and 220.

As shown in the example of FIG. 3, communication facility 100 exposes a collection of software interfaces 114, also referred to herein as application programming interfaces (APIs), that allow customer systems 196A-196D (collectively "customer systems 196") programmatic access to capabilities and assets of programmable network platform 103 of communication facility 100. That is, software interfaces 114 provide an extensible framework that allows software developers associated with the customers of communication facility 100 to create software applications executable on customer systems 196 that allow and leverage access to sub-systems 120 of communication facility 100. Underlying subsystems 120 of communication facility 100 may, for example, control provisioning and managing of all aspects of communication facility 100, including: (1) provisioning ports and interconnects of active panels 208, (2) identification and authorization of carriers, (3) management and fulfillment of orders, (4) delivery of network services, (5) managing inventory and capacity, (6) managing and reporting/alerting incidence, and (7) content management.

As such, carriers 106 and other customers of communication facility 100, such as network services providers, cloud services providers, managed service providers and other enterprises may make use of the software interfaces exposed by the programmable network platform to manage their direct cross-connects with other carriers via provisioning of active panels 208. That is, software interfaces 114 enable machine-to-machine communication, shown as dotted arrows in FIG. 3, between network infrastructure and provisioning/billing/accounting/AAA systems positioned within different carrier networks 205, 210, 215 and 220 for carriers 106 establishing and managing direct cross-connects. As such, software interfaces 114 enable near real-time setup and modifications of provisioned ports, e.g., virtual connections within active panels 208, and may also eliminate or reduce the need for human interaction for the entire provisioning set-up and management process. In this way, the software interfaces provide an automated and seamless way for carriers 106 to establish, de-install and manage provisioned ports of active panels 208 and interconnection with multiple, different customers participating in communication facility 100.

Moreover, as further shown in the example of FIG. 2, communication facility 100 includes an internal orchestration engine 118 that organizes, directs and integrates underlying software and network sub-systems 120 for managing various aspects of the provisioning services provided by communication facility 100. Orchestration engine 118 may, for example, provide a rule-drive workflow engine that operates between APIs 114 and the underlying programmable network platform provided by subsystems 120 of communication facility 100. In this way, orchestration engine 118 can be invoked by customer-proprietary applications executing on customer systems 196 by way of APIs 114 for direct participation within the programmable network platform of the metro-wide infrastructure.

As described herein, orchestration engine 118 synthesizes the information and actions from underlying sub-systems 120 of the programmable network platform to formulate intelligent next steps and responses to the customer applications. As such, orchestration engine 118 abstracts the complexity of the underlying software and network sub-systems 120 of the communication facility 100 by providing a uniform, simplified and secured means to access the programmable network platform.

Further example details of an communication facility 100 that includes a cloud-based services exchange are found in U.S. Provisional Patent Application 62/149,374, filed Apr. 17, 2015 and entitled "Cloud-Based Services Exchange;" U.S. Provisional Patent Application 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" and in U.S. Provisional Patent Application 62/160,547, filed May 12, 2015 and entitled "PROGRAMMABLE NETWORK PLATFORM FOR A CLOUD-BASED SERVICES EXCHANGE;" each of which are incorporated herein by reference in their respective entireties.

Further example details of an communication facility 100 that includes a carrier Ethernet exchange are found in U.S. Pat. No. 8,537,845 entitled "REAL TIME CONFIGURATION AND PROVISIONING FOR A CARRIER ETHERNET EXCHANGE", filed Sep. 13, 2012; U.S. Utility application titled "REAL TIME CONFIGURATION AND PROVISIONING FOR A CARRIER ETHERNET EXCHANGE" filed on Sep. 2, 2010 having application Ser. No. 12/875,054; U.S. Provisional application titled "ETHERNET EXCHANGE" filed on Dec. 10, 2009 having application Ser. No. 61/285,371; U.S. Provisional application titled "PRIVATE NETWORK CONNECTIVITY PLATFORM" filed on Sep. 4, 2009 having application Ser. No. 61/239,997; U.S. Provisional application titled "ETHERNET EXCHANGE" filed on Apr. 12, 2010 having application Ser. No. 61/323,066; U.S. patent application titled "REAL TIME CONFIGURATION AND PROVISIONING FOR A CARRIER ETHERNET EXCHANGE" filed on Sep. 2, 2010 having application Ser. No. 12/875,054. Each of the above patents and patent applications are incorporated herein by reference in their respective entireties. Communication facility 100 may include both a carrier Ethernet exchange and a cloud-based services exchange, in some examples.

FIGS. 4-11 are block diagrams each illustrating different examples of an active panel situated in a cage mesh demarcating a secure customer area within a cage from the provider area, in accordance with techniques described herein. Cage 124 and active panel 208 of FIGS. 4-11 may represent example instances of any of cage 124 and active panel 208 as described in FIG. 3.

Figure 4:
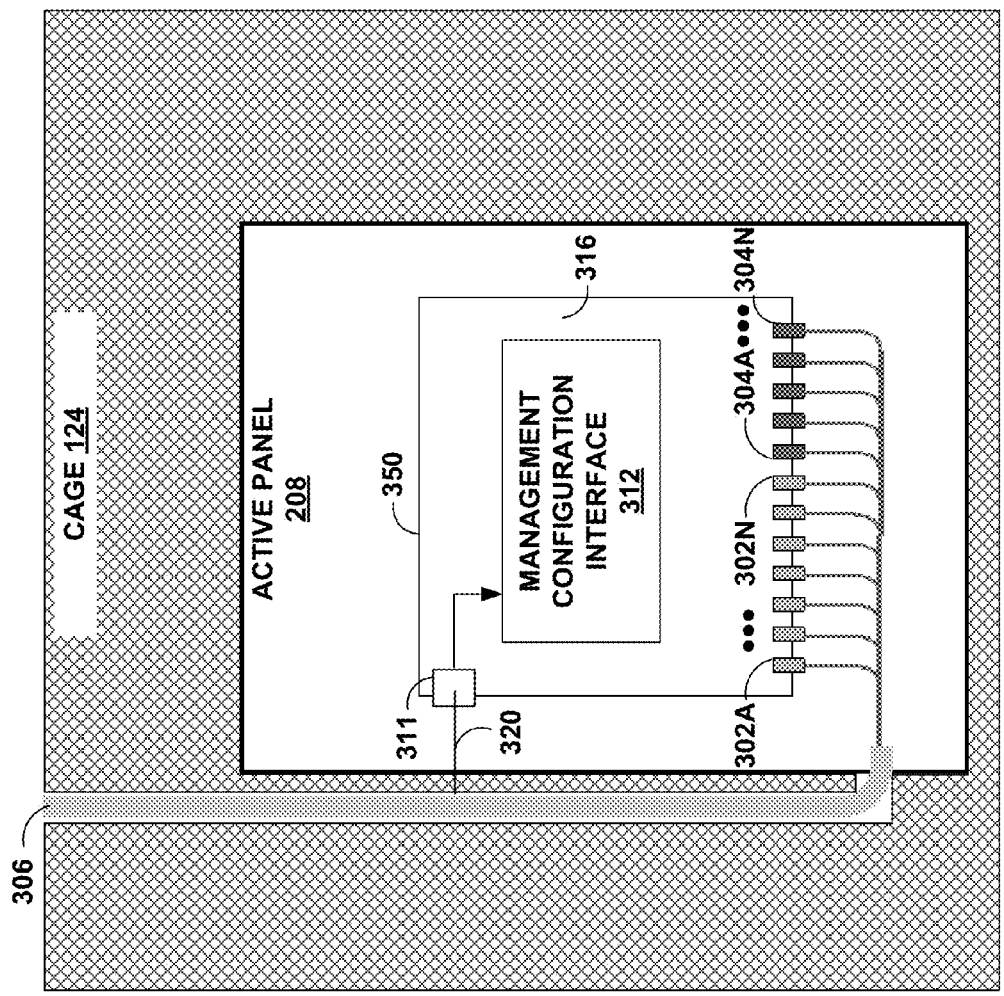
FIGS. 4-11 are block diagrams each illustrating different examples of an active panel situated in a cage mesh demarcating a secure customer area within a cage from the provider area, in accordance with techniques described herein.

FIG. 4 is a block diagram illustrating a provider view of an example active panel 208, in accordance with techniques described herein. In the example of FIG. 4, active panel 208 includes provider Ethernet ports 302A-302N (collectively "provider Ethernet ports 302") and provider optical ports 304A-304N (collectively "provider optical ports 304"), infrastructure conduit 306, management configuration interface 312, configuration port 311, and switch 350. In some examples, switch 350 may correspond to any of NID 6, 8 described in FIG. 1.

Switch 350 is a network switch and/or a router device. In some examples, switch 350 as a network switch may be a computer networking device, which may use packet or cell switching to receive, process, and forward data to a destination device of one or more devices connected by switch 350. In some examples, switch 350 may be an Ethernet switch. In some examples, switch 350 may also process data at the network layer (layer 3) by incorporating routing functionality to perform packet forwarding. In these examples, switch 350 may be a layer-3 switch or a multilayer switch. In some examples, switch 350 as a router device may be a networking device or module that forwards data packets between computer networks. In some examples, switch 350 may have a switching module configured to partition a single layer-2 network to create multiple distinct broadcast domains that are mutually isolated, such that packets may only pass between them via one or more routers. In other words, the switching module of switch 350 may be configured to provision ports of switch 350 by creating a virtual local area network (VLAN) between the ports of switch 350. In some examples, switch 350 may be configured to perform at least one of Ethernet switching or photonic switching.

Provider Ethernet ports 302 are Ethernet ports on side 316 of switch 350 that are only accessible by the provider. Provider optical ports 304 are optical ports on side 316 of switch 350 that are only accessible by the provider. Infrastructure conduit 306 is a conduit for connecting provider Ethernet ports 302 and provider optical ports 304 to a metro-wide infrastructure (e.g., network infrastructure 100 as described in FIG. 3).

Management configuration interface 312 is an interface for configuring switching module of switch 350 to provide virtual connections between provider Ethernet ports 302 and provider optical ports 304 to the customer ports of switch 350 as described herein. In other words, an application may invoke management configuration interface 312 to control the switching module of switch 350 to provision the customer ports to provider Ethernet and optical ports 302, 304 of switch 350 by creating, modifying, or removing connections between the customer ports and provider Ethernet and optical ports 302, 304 of switch 350.

In some examples, management configuration interface 312 includes a software-defined network (SDN) interface by which a SDN controller configures the active panel 208. As such, programmable network platform 3 may configure active panel 208 by issuing configuration commands either directly to the active panel 208 by way of management configuration interface 312, or indirectly to the active panel 208 via an SDN controller that manages the active panel 208 on behalf of the programmable network platform 3. Programmable network platform 3 may in some instances be alternatively referred to as an orchestrator in that programmable network platform 3 orchestrates SDN controllers so as to configure active panels and and/or other elements of the network infrastructure to dynamically establish interconnections.

In some examples, provider Ethernet ports 302 and provider optical ports 304 (collectively "provider ports") are connected to network infrastructure 100 via cabling within infrastructure conduit 306 at a first side of the provider ports, and are connected to the switching module of switch 350 at a second side of the provider ports. In some examples, management configuration interface 312 may be accessible by only the provider through at least one of the provider ports. In the illustrated example, management configuration interface 312 may be accessible by only the provider by a dedicated provider port 311 also coupled in this example to network infrastructure via a cable 320 running within infrastructure conduit 306. As a result, a programmable network platform as described herein may access management configuration interface 312 via the network infrastructure in order to provision connections between provider ports 302, 304 and customer ports. Although illustrated as set off from other provider ports 302, 304, provider port 311 may in some aspects be any of provider ports 302, 304 utilized by the communication facility provider to send configuration commands to the switch 350 using the management configuration interface 312.

Figure 5:
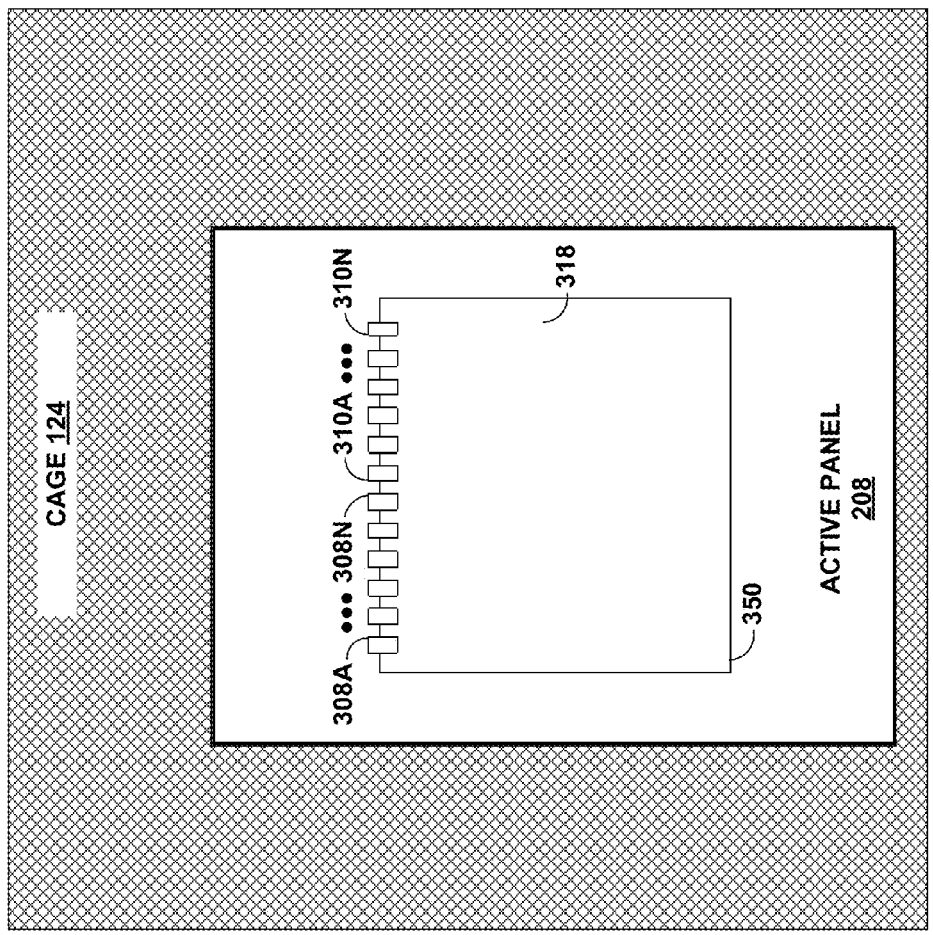

FIG. 5 is a block diagram illustrating a customer view of an example active panel 208, in accordance with techniques described herein. In the example of FIG. 5, active panel 208 includes customer Ethernet ports 308A-308N (collectively "customer Ethernet ports 308") and customer optical ports 310A-310N (collectively "customer optical ports 310"), and switch 350. In the example of FIG. 5, active panel 208 and switch 350 may correspond to active panel 208 and switch 350 as described in FIG. 4.

Customer Ethernet ports 308 are Ethernet ports on side 318 of switch 350 that are only accessible by the customer within cage 124. Customer optical ports 310 are optical ports on side 318 of switch 350 that are only accessible by the customer within cage 124. In some examples, customer Ethernet ports 308 and customer optical ports 310 (collectively "customer ports") are configured to be connected to networks and/or systems of the customer at a first side of the customer ports, and are connected to switch 350 as described in FIG. 4 at a second side of the customer ports. The customer may perform "in-cage" cabling to connect Ethernet cables to Ethernet ports 308 and optical cables to optical ports 310, each of the Ethernet and/or optical cables also connected to customer equipment securely situated within the cage 124 and inaccessible to the communication facility provider, among others. In this way, the customer may securely complete in-cage cabling in order to prepare for on-demand provisioning of interconnection services by the communication facility.

Figure 6:
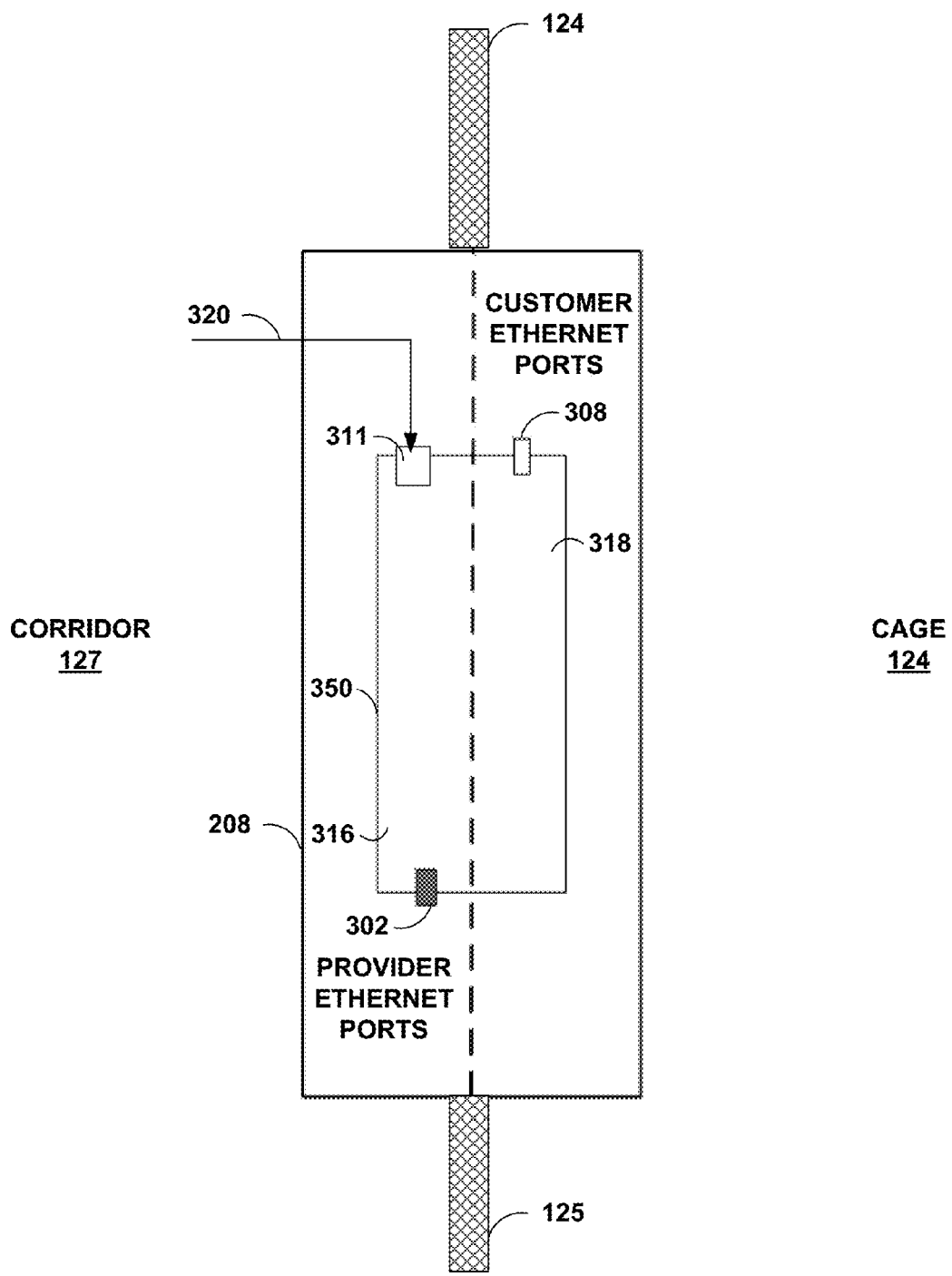

FIG. 6 is a block diagram illustrating a side view of an example active panel 208, in accordance with techniques described herein. In the example of FIG. 6, active panel 208 includes provider Ethernet ports 302 and customer Ethernet ports 308, configuration port 311, and switch 350. In the example of FIG. 6, active panel 208, provider Ethernet ports 302, customer Ethernet ports 308, and switch 350 may correspond to active panel 208, provider Ethernet ports 302, customer Ethernet ports 308, and switch 350 as described in FIGS. 4 and 5.

Provider Ethernet ports 302 are Ethernet ports on side 316 of switch 350 that are only accessible by the provider, as shown by the dashed line representing the division between the provider and customer access of active panel 208. Customer Ethernet ports 308 are Ethernet ports on side 318 of switch 350 that are only accessible by the customer within cage 124 defined in part by cage mesh 125 and the provider-customer demarcation shown by the dashed line representing the division between the provider and customer access to active panel 208.

Switch 350 may be configured to provision connectivity between select customer Ethernet ports 308 to select provider Ethernet ports 302 based on an provisioning data from a programmable network platform (e.g., programmable network platform 103 as described in FIG. 3) received at configuration port 311 (or in some aspects via one of provider Ethernet ports 302 or provider optical ports 304 as described in FIG. 4).

Figure 7:
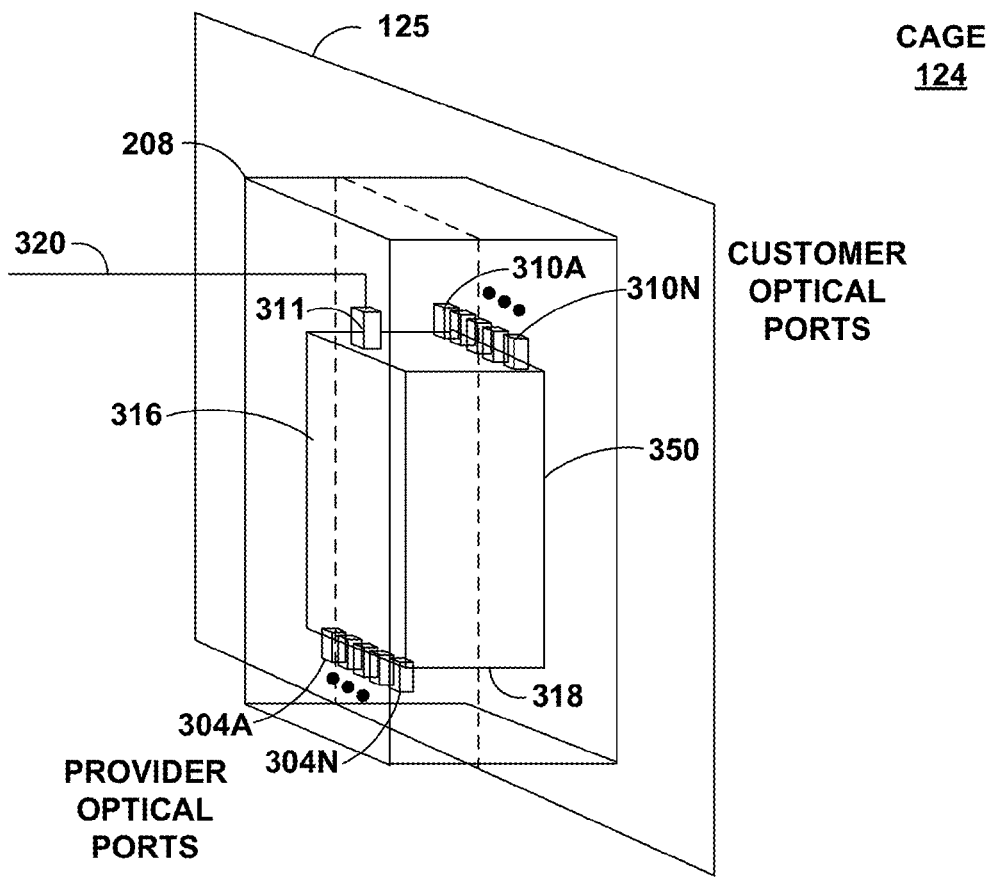

FIG. 7 is a block diagram illustrating a three-dimensional view of an example active panel 208, in accordance with techniques described herein. In the example of FIG. 7, active panel 208 includes switch 350 including provider optical ports 304, customer optical ports 310, and configuration port 311. In the example of FIG. 7, active panel 208, provider optical ports 304, customer optical ports 310, and switch 350 may correspond to active panel 208, provider optical ports 304, customer optical ports 310, and switch 350 as described in FIGS. 4 and 5.

Provider optical ports 304 are optical ports on side 316 of switch 350 that are only accessible by the provider, as shown by the dashed line representing the division between the provider and customer access of active panel 208. Customer optical ports 310 are optical ports on side 318 of switch 350 that are only accessible by the customer within cage 124, as shown by the dashed line representing the division between the provider and customer access of active panel 208 together with cage mesh 125 demarcating customer side 318 and provider side 316. The communication facility provider technicians or agents walking corridor 127 may access the provider side 318 of active panel 208.

Figure 8:
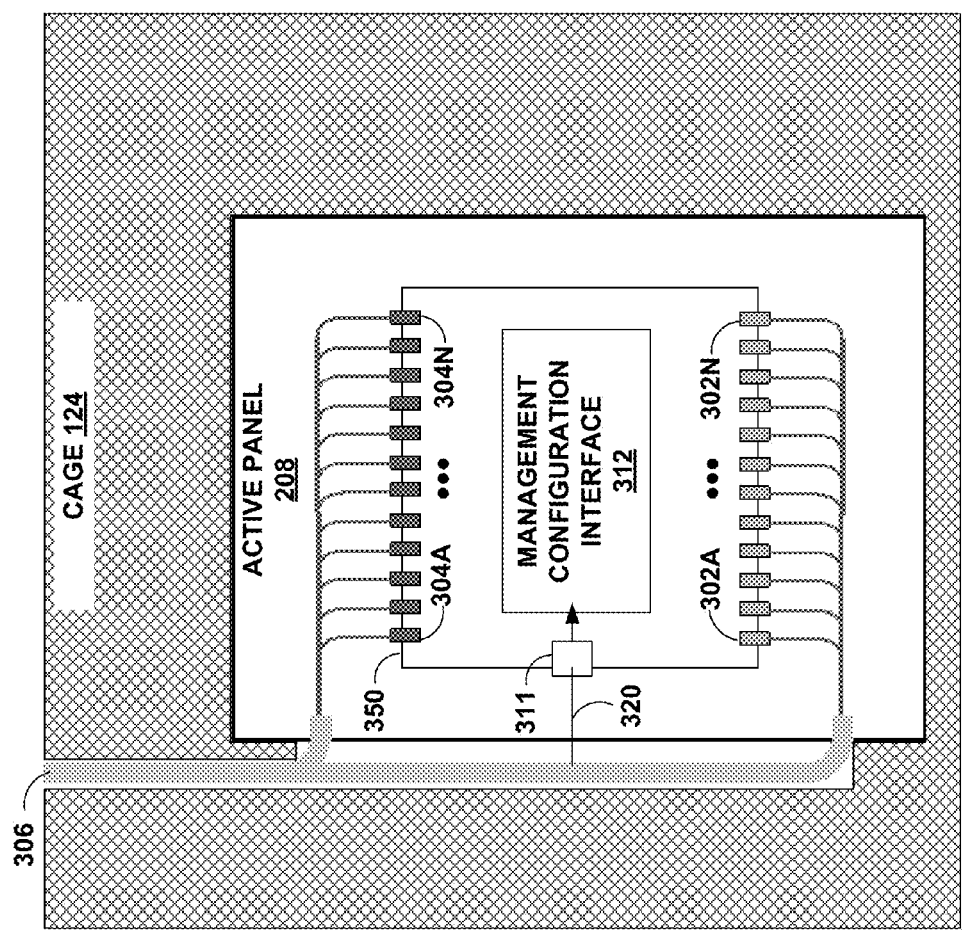

FIG. 8 is a block diagram illustrating a provider view of an example active panel 208, in accordance with techniques described herein. In the example of FIG. 8, active panel 208 includes provider Ethernet ports 302A-302N (collectively "provider Ethernet ports 302"), provider optical ports 304A-

304N (collectively "provider optical ports 304"), management configuration interface 312, and switch 350. In the example of FIG. 8, active panel 208 may be connected to a network infrastructure with multiple communication cables running through infrastructure conduit 306.

Ethernet cables running through infrastructure conduit 306 may be pre-provisioned by the communication facility provider to any one or more of Ethernet ports 302, and optical cables running through infrastructure conduit 306 may be pre-provisioned by the communication facility provider to any one or more of optical ports 304.

Figure 9:
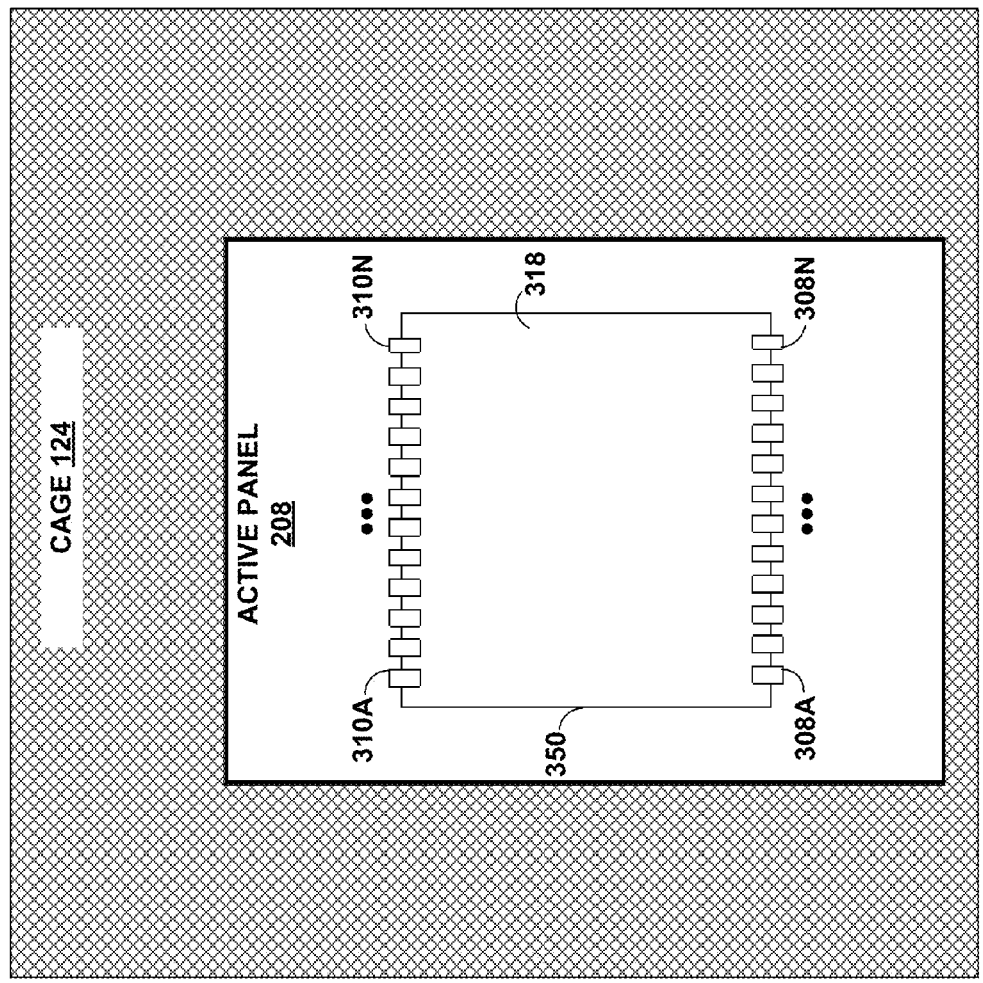

FIG. 9 is a block diagram illustrating a customer view of an example active panel 208, in accordance with techniques described herein. In the example of FIG. 9, switch 350 of active panel 208 includes customer Ethernet ports 308A-308N (collectively "customer Ethernet ports 308"), and customer optical ports 310A-310N (collectively "customer optical ports 310") to which the customer may perform in-cage cabling by connecting one or more Ethernet cables and one or more optical cables, respectively.

Figure 10:
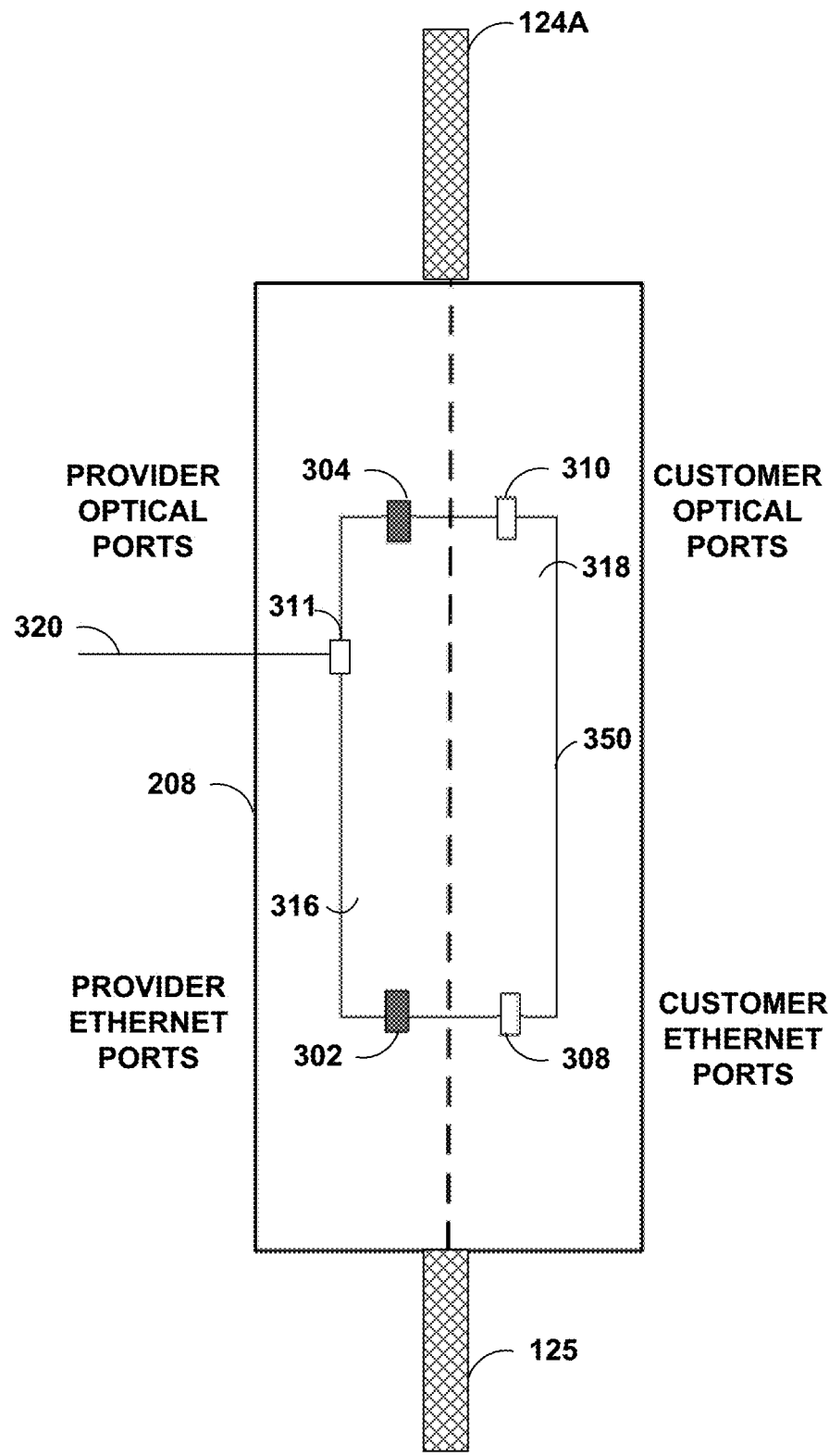

FIG. 10 is a block diagram illustrating a side view of an example active panel 208, in accordance with techniques described herein. In the example of FIG. 10, active panel 208 includes provider Ethernet ports 302, provider optical ports 304 customer Ethernet ports 308, customer optical ports 310, management configuration interface 312, input 320, and switch 350. In some examples, cage 124, active panel 208, provider Ethernet ports 302, provider optical ports 304 customer Ethernet ports 308, customer optical ports 310, management configuration interface 312, input 320, and switch 350 may correspond to cage 124, active panel 208, provider Ethernet ports 302, provider optical ports 304 customer Ethernet ports 308, customer optical ports 310, management configuration interface 312, input 320, and switch 350 as described in FIGS. 4 and 5.

In some examples, provider Ethernet ports 302 on side 316 of switch 350 and provider optical ports 304 on side 318 (collectively "provider ports") are only accessible by the provider, as shown by the dashed line representing the division between the provider and customer access of active panel 208. In some examples, customer Ethernet ports 308 on side 318 and customer optical ports 310 on side 318 (collectively "customer ports") of switch 350 that are only accessible by the customer within cage 124, as shown by the dashed line representing the division between the provider and customer access of active panel 208.

Figure 11:
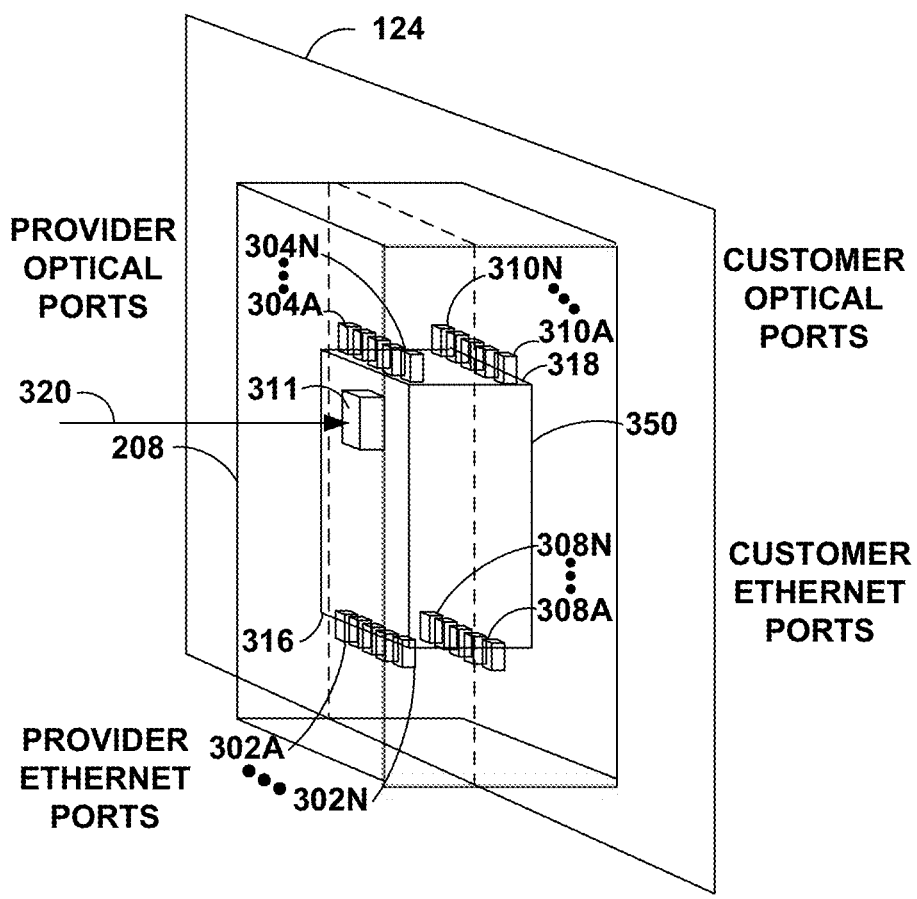

FIG. 11 is a block diagram illustrating the example active panel of FIG. 10 in three-dimensions.

Further example details of a demarcation panel in a cage can be found in U.S. Pat. No. 8,650,805, entitled "SYSTEMS AND METHODS FOR DMARC IN A CAGE MESH DESIGN" filed Sep. 7, 2010; U.S. Utility application titled "SYSTEMS AND METHODS FOR DMARC INA CAGE MESH DESIGN" filed on Sep. 7, 2010 having application Ser. No. 12/876,911; and U.S. Provisional application titled "A DMARC IN A CAGE MESH DESIGN" filed on May 17, 2010 having application Ser. No. 61/345,445. Each of the above patents and patent applications are incorporated herein by reference in their respective entireties.

Figure 12:
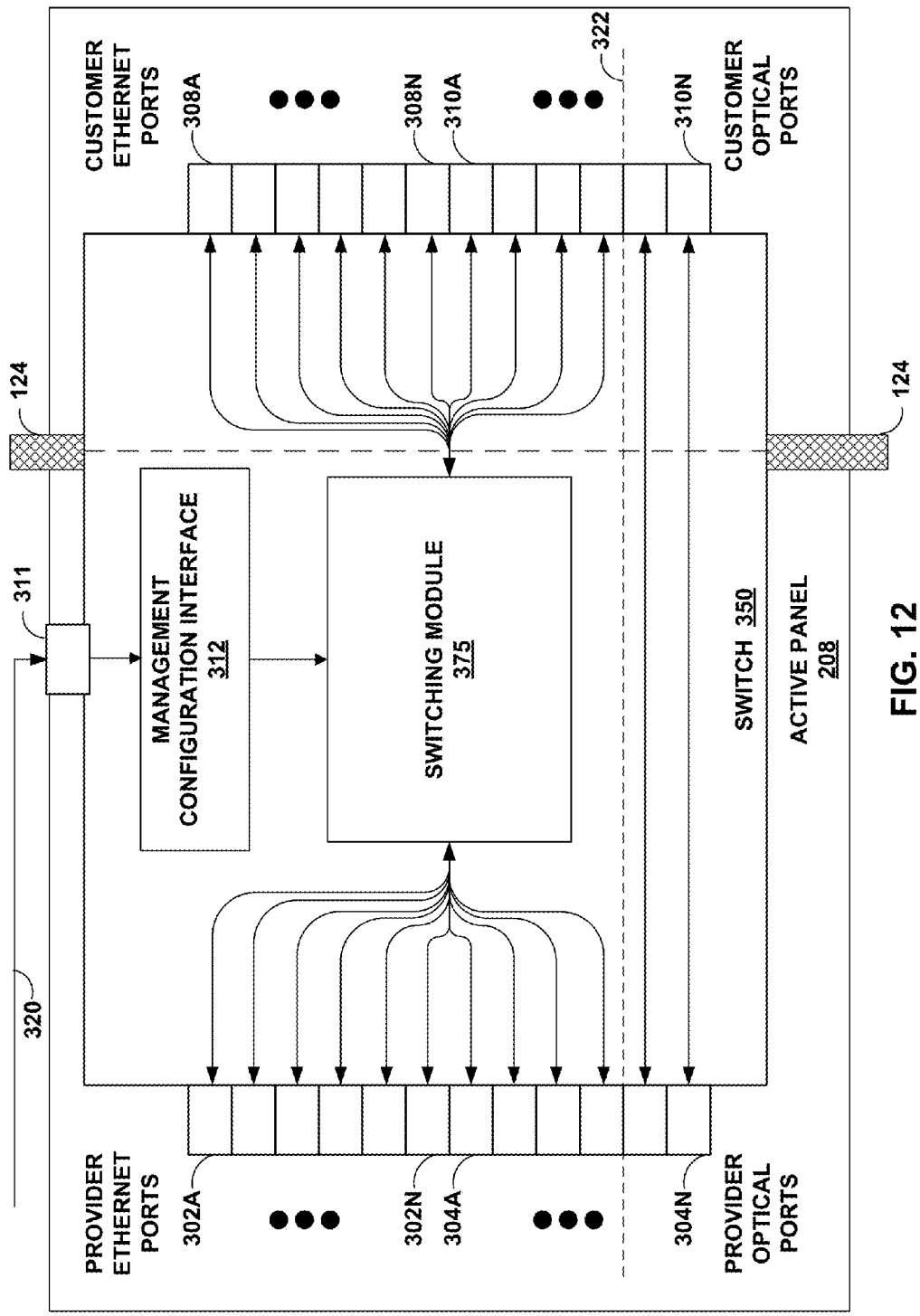
FIG. 12 is a block diagram illustrating an example active panel with operations performed by example components of a switch for a programmable network platform for a communication facility, in accordance with techniques described herein.

FIG. 12 is a block diagram illustrating an example active panel 208 with operations performed by example components of switch 350 for a programmable network platform for an communication facility, in accordance with techniques described herein.

In the example of FIG. 12, active panel 208 includes provider Ethernet ports 302A-302N (collectively "302"), provider optical ports 304A-304N (collectively "304"), customer Ethernet ports 308A-308N (collectively "308"), customer optical ports 310A-310N (collectively "310"), management configuration interface 312, input 320, switch 350, and switching module 375. In some examples, cage 124, active panel 208, provider Ethernet ports 302, provider optical ports 304, customer Ethernet ports 308, customer optical ports 310, management configuration interface 312, and switch 350 may correspond to cage 124, active panel 208, provider Ethernet ports 302, provider optical ports 304, customer Ethernet ports 308, customer optical ports 310, management configuration interface 312, input 320, and switch 350 as described in FIGS. 4 and 5.

Pass-through line 322 denotes sections of active panel 208. In some examples, pass-through line 322 may create a first section where provider ports of switch 350 are dynamically provisioned by switching module 375 to customer ports of switch 350 based on provisioning data received by management configuration interface 312 and a second section where provider ports are directly and statically connected to customer ports. Although pass-through line 322 illustrates an example of customer optical ports 310 directly connected to provider optical ports 304, pass-through line 322 in another example could illustrate customer Ethernet ports 308 directly connected to provider Ethernet ports 302. In other words, switch 350 in various examples may have at least one customer Ethernet port 308 and/or customer optical port 310 directly and statically connected to provider Ethernet ports 302 and provider optical ports 304.

Switching module 375 is controlled by management configuration interface 312 and enables management configuration interface 312 to dynamically provision the customer ports to the provider ports with virtual connections based on provisioning data received via cable 320 (e.g., an input from the provider, an input from a programmable network platform, or the like) by management configuration interface 312 according to techniques described herein.

In some examples, management configuration interface 312 may be configured to control switching module 375 to dynamically provision customer ports to provider ports based on an input from a programmable network platform (e.g., programmable network platform 103 as described in FIG. 3). In some examples, management configuration interface 312 may be configured to receive an input from the programmable network platform via one of the provider ports. In this way, management configuration interface 312 may be configured to control switching module 375 to dynamically and automatically provision customer ports to provider ports based on the input received from the programmable network platform.

In some examples, management configuration interface 312 may be configured to control switching module 375 based on provisioning data received from the provider to dynamically and automatically provision connections between customer ports and provider ports. In these examples, management configuration interface 312 may be configured to receive input 320 from the provider via a direct connection separate from provider ports. In this way, management configuration interface 312 may be configured to control switching module 375 to dynamically and automatically provision customer ports to provider ports based on the input received from the provider.

Switching module 375 includes programmable processors, controllers, or other configurable logic (such as ASICs, FPGAs, CPLDs, etc.) for physically or logically connecting provider ports to customer ports, and vice-versa. Switching module 375 may represent a cross-bar switch or switching fabric, an Ethernet or other L2 switch, a VLAN-enable Ethernet switch, a photonic or optical switch for layer 0 and/or layer 1 switching, or other logic or mechanisms for directing packets received on a provider port to a connected customer port, according to a configuration of switch 350.

Switching module 375 may in some examples switch packets received on customer Ethernet port 308A, e.g., for output via multiple provider Ethernet ports 302A-302N. As noted above, pre-provisioned cross-connect infrastructure of the communication facility represents a pool of interconnect capacity connected to the provider ports and may be dynamically selected and used on-demand by customers, with provisioning of the active panel 208. In response to receiving provisioning data received via management configuration interface 312 connecting Ethernet ports 302A-302B with customer Ethernet port 308A, switching module 375 may multiplex customer-sourced packets received on customer Ethernet port 308A for output via provider Ethernet ports 302A-302B. In some examples, switching module 375 may use statistical multiplexing to balance uplink traffic via the provider Ethernet ports 302A-302B, at least in some cases proportional to the respective uplink bandwidths for the provider Ethernet ports 302A-302B. Such statistical multiplexing may be based on the number of packets, the number of bytes, and the number of flows, for instance.

In some examples, switch 350 is configured to logically interconnect provider ports 302 and customer ports 308 using VLANs, according to provisioning data received via management configuration interface 312. For example, customer port 308A may be configured with VLAN 1, and VLAN 1 may be mapped to provider port 302A such that packets received on customer port 308A are forwarded via provider port 302A. In this way, the active panel 208 enables multiplexing multiple customer services over a common endpoint.

Figure 13:
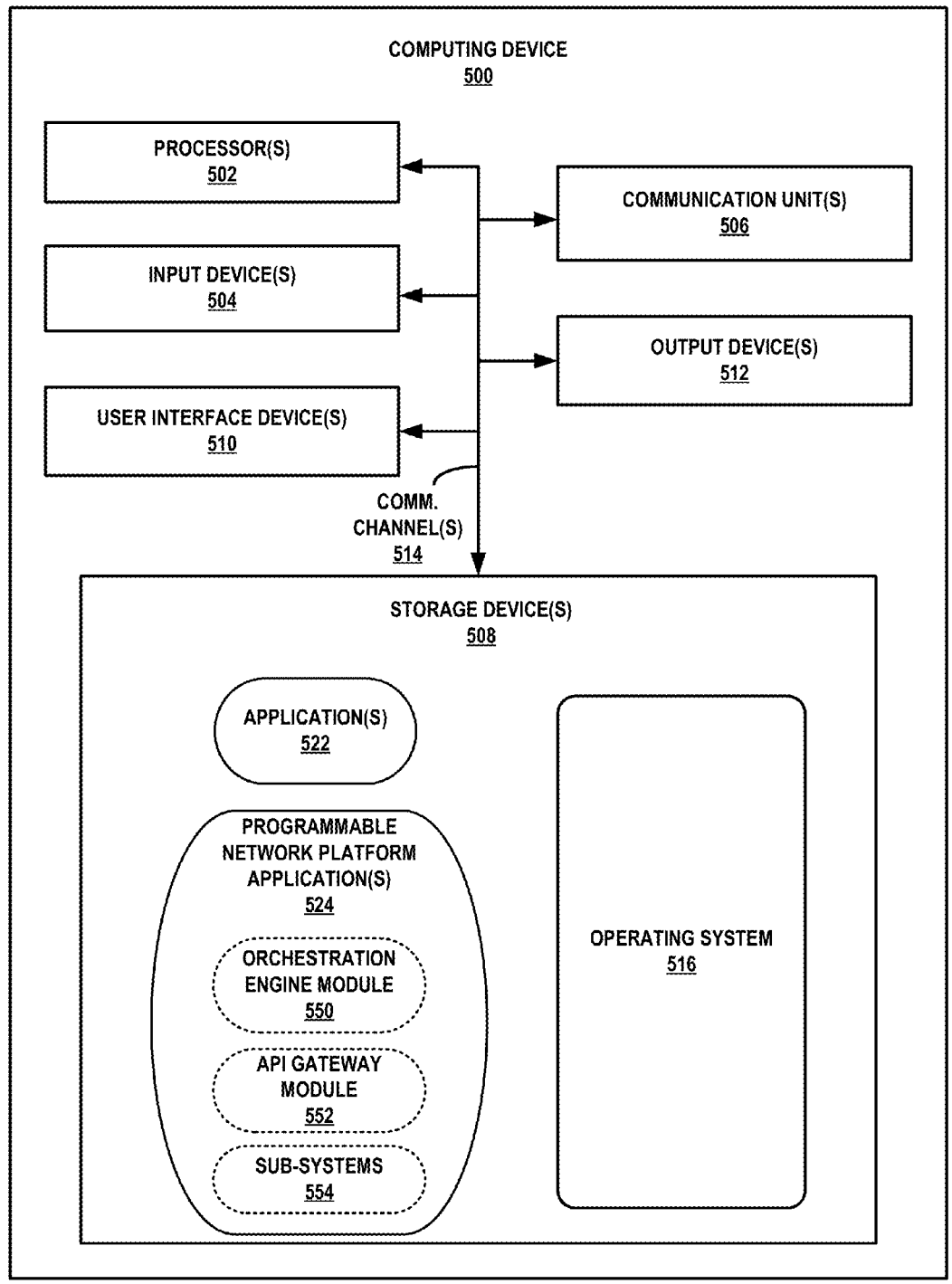
FIG. 13 is a block diagram illustrating further details of one example of a computing device that operates, in accordance with techniques described herein.

FIG. 13 is a block diagram illustrating further details of one example of a computing device that operates in accordance with one or more techniques of the present disclosure. FIG. 13 may illustrate a particular example of a server or other computing device 500 that includes one or more processor(s) 502 for executing any one or more of API gateway 112, orchestration engine 118, sub-systems 120, configuration management interface 312, switch 350, or any other computing device described herein. Other examples of computing device 500 may be used in other instances. Although shown in FIG. 13 as a stand-alone computing device 500 for purposes of example, a computing device may be any component or system that includes one or more processors or other suitable computing environment for executing software instructions and, for example, need not necessarily include one or more elements shown in FIG. 13 (e.g., communication units 506; and in some examples components such as storage device(s) 508 may not be co-located or in the same chassis as other components).

As shown in the specific example of FIG. 13, computing device 500 includes one or more processors 502, one or more input devices 504, one or more communication units 506, one or more output devices 512, one or more storage devices 508, and user interface (UI) device 510, and communication unit 506. Computing device 500, in one example, further includes one or more applications 522, virtual concept-building application 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and programmable network platform application(s) 524 with processors 502, communication unit 506, storage device 508, input device 504, user interface devices 510, and output device 512.

Application 522 and programmable network platform application(s) 524 may also include program instructions and/or data that are executable by computing device 500. Example programmable network platform application(s) 524 executable by computing device 500 may include any one or more of orchestration engine module 550, API gateway module 552, and sub-systems 554, each illustrated with dashed lines to indicate that these may or may not be executable by any given example of computing device 500.

Orchestration engine module 550 may include instructions for causing computing device to perform one or more of the operations and actions described in the present disclosure with respect to orchestration engine 118. As one example, orchestration engine module 550 may include instructions that cause computing device 500 to organize, direct and integrate underlying software sub-systems of the programmable network platform for a network infrastructure, including managing various aspects of provisioned ports of active panels 208, interconnecting customer ports of an active panel 208 to provider ports of the active panel 208, provisioning connectivity between customer networks within the network infrastructure and cloud service provider networks, orchestrating native services (e.g., firewall, network address translation, deep packet inspection, traffic shaping, DDoS) within the communication facility, and/or cloud services management, for instance. The orchestration engine module 550 may, for example, provide a rule-driven workflow engine that operates between the APIs and the underlying programmable network platform of a metro-wide infrastructure that includes sub-systems and network infrastructure.

API gateway module 552 may include instructions for causing computing device to perform one or more of the operations and actions described in the present disclosure with respect to API gateway 112. As one example, API gateway module 552 may include instructions that cause computing device 500 to expose a collection of software interfaces, e.g., APIs 114, that define the methods, fields, and/or other software primitives by which applications may invoke the programmable network platform. These software interfaces allow carriers and customers programmable access to capabilities and assets of a cloud exchange.

Sub-systems 554 may include instructions for causing computing device to perform one or more of the operations and actions described in the present disclosure with respect to sub-systems 120.

Figure 14:
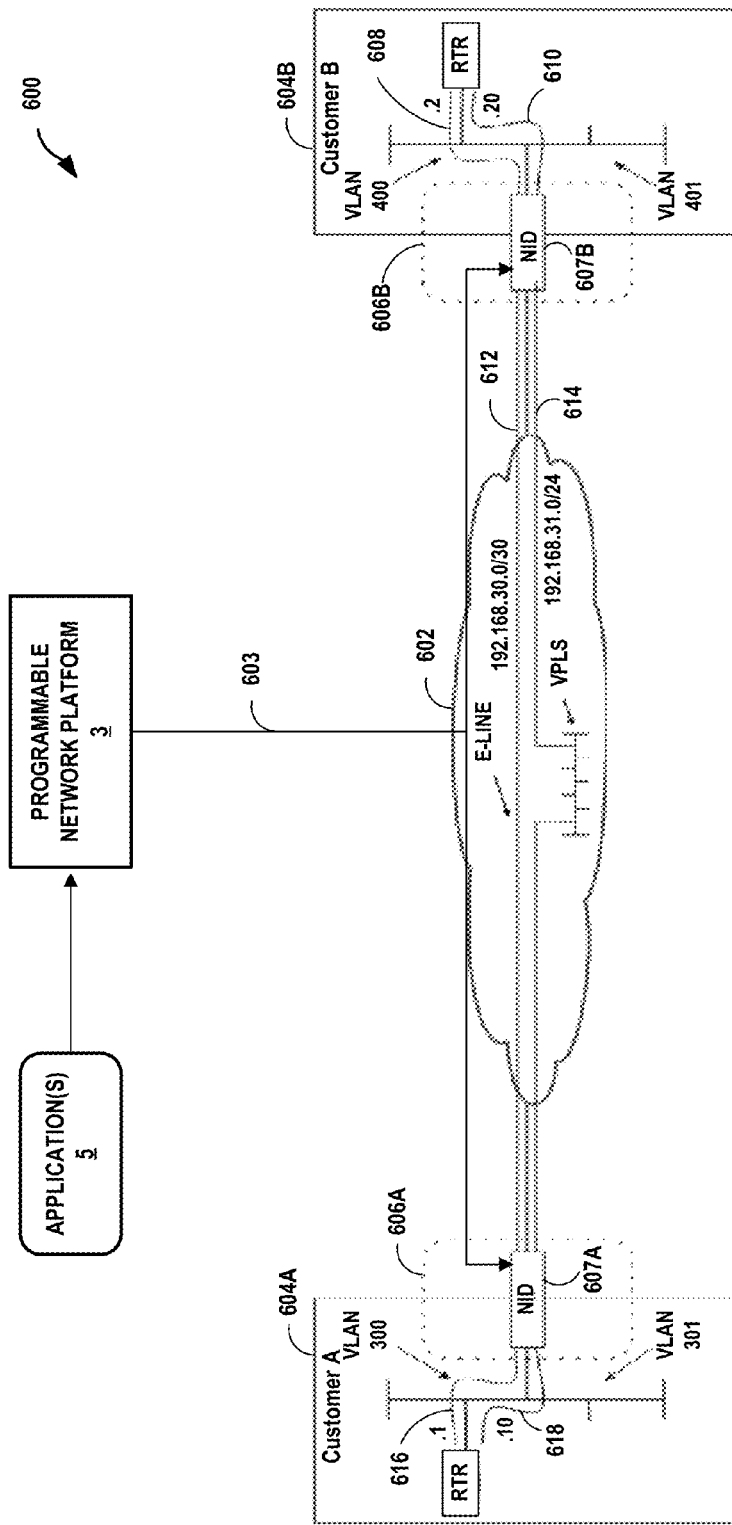
FIG. 14 is a block diagram illustrating an example end-to-end service dynamically established between customer networks of a communication facility, in accordance with techniques described herein.

FIG. 14 is a block diagram illustrating an example end-to-end service dynamically established between customer networks of a communication facility, in accordance with techniques described herein. Network system 600 includes network infrastructure 602 and cages 604A-604B of a communication facility. Each of cages 604A-604B includes a corresponding active panel 606A-606B providing secure access to customers and the communication facility provider, as well as dynamic interconnection of customer and provider ports according to techniques described in this disclosure. Each of active panels 606A-606B includes a corresponding one of NIDs 607A-607B, which may represent example instances of NIDs 6, 8 of FIG. 1.

Programmable network platform 3 provisions network infrastructure with two different example types of layer 2 virtual private networks (L2VPNs), an E-LINE network 612 and a Virtual Private LAN Service (VPLS) 614. E-LINE network 612 is a point-to-point L2VPN that in this example connects at least one provider port of NIC 607A to one provider port of NIC 607B through network infrastructure 602. E-LINE network 612 may represent or include, for instance, a provider VLAN or VxLAN, a pseudowire, another tunnel, and/or a physical connection. In order to provision connectivity between respective L2 networks of customer A of cage 604A and customer B of cage 604B, in conjunction with provisioning E-LINE 612, programmable network platform 3 additionally sends configuration data 603 that provisions NIDs 607A, 607B to interconnect the provider ports, to which E-LINE 612 is connected, to the customer ports of the NIDs 607A, 607B to which the customer L2 networks are connected. In the illustrated example, VLAN 616 (associated with VLAN id 300) is a customer L2 network of customer A and VLAN 608 (associated with VLAN id 400) is a customer L2 network of customer B. Configuration data 603 causes NID 607A to be configured to interconnect a customer port of NIC 607A that is configured with VLAN 616 and a provider port of NIC 607A that is connected to E-LINE 612. Configuration data 603 also causes NID 607B to be configured to interconnect a customer port of NIC 607B that is configured with VLAN 608 and a provider port of NIC 607B that is connected to E-LINE 612. In this way, programmable network platform 3 may dynamically configure active panels 606 to interconnect different customer networks of the communication facility via the infrastructure network 602.

VPLS 614 is a multipoint-to-multipoint L2VPN that in this example connects at least one provider port of NIC 607A to one provider port of NIC 607B through network infrastructure 602. VPLS 614 may represent or include, for instance, a provider VLAN or VxLAN, a mesh of pseudowires, and/or a physical LAN. In order to provision connectivity between respective L2 networks of customer A of cage 604A and customer B of cage 604B, in conjunction with provisioning VPLS 614, programmable network platform 3 additionally sends configuration data 603 that provisions NIDs 607A, 607B to interconnect the provider ports, to which VPLS 614 is connected, to the customer ports of the NIDs 607A, 607B to which the customer L2 networks are connected. In the illustrated example, VLAN 618 (associated with VLAN id 301) is a customer L2 network of customer A and VLAN 610 (associated with VLAN id 401) is a customer L2 network of customer B. Configuration data 603 causes NID 607A to be configured to interconnect a customer port of NIC 607A that is configured with VLAN 618 and a provider port of NIC 607A that is connected to VPLS 614. Configuration data 603 also causes NID 607B to be configured to interconnect a customer port of NIC 607B that is configured with VLAN 610 and a provider port of NIC 607B that is connected to VPLS 614. In this way, programmable network platform 3 may dynamically configure active panels 606 to interconnect different L2 customer networks of the communication facility via the infrastructure network 603.

Figure 15:
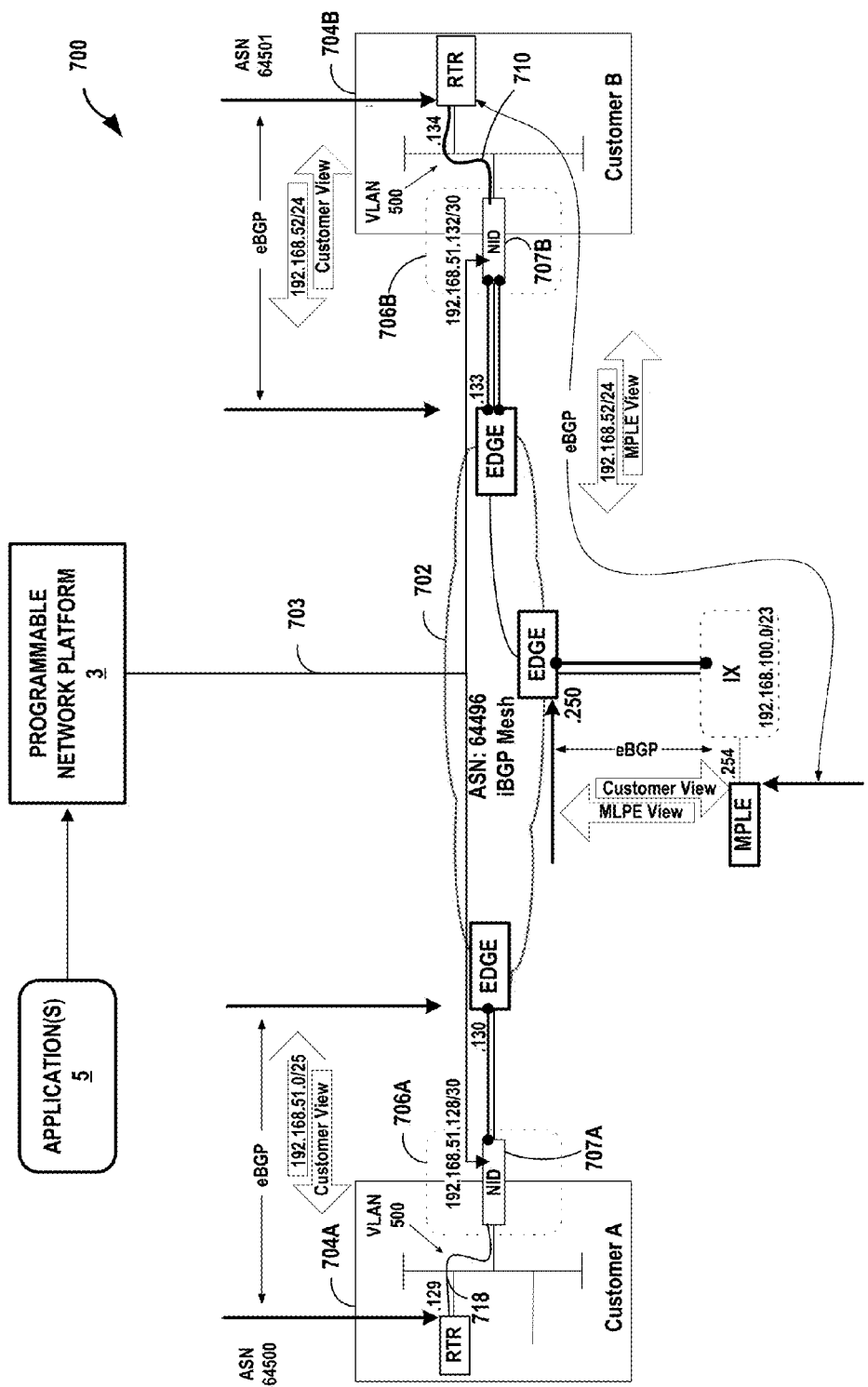
FIG. 15 is a block diagram illustrating an example end-to-end layer 3 service dynamically established between customer networks of a communication facility, in accordance with techniques described herein.

FIG. 15 is a block diagram illustrating an example end-to-end layer 3 service dynamically established between customer networks of a communication facility, in accordance with techniques described herein. Network system 700 includes network infrastructure 702 and cages 704A-704B of a communication facility. Each of cages 704A-704B includes a corresponding active panel 706A-706B providing secure access to customers and the communication facility provider, as well as dynamic interconnection of customer and provider ports according to techniques described in this disclosure. Each of active panels 706A-706B includes a corresponding one of NIDs 707A-707B, which may represent example instances of NIDs 6, 8 of FIG. 1.

In this example, network infrastructure 702 includes a layer 3 (L3) autonomous system having a plurality of edge routers interconnected by an iBGP mesh to provide layer 3 connectivity between customer networks that peer to the L3 autonomous system according to an L3 routing protocol to exchange L3 routes with the L3 autonomous system, and in doing so facilitate end-to-end layer 3 connectivity between the customer networks.

Programmable network platform 3 may provision network infrastructure 720 with virtual routing and forwarding tables (VRFs) for a layer 3 interconnection service between cages 704A and 704B, in order to connect (at layer 3) the customer L3 autonomous system having AS number (ASN) 64500 and associated with customer A with the customer L3 autonomous system having ASN 64501 and associated with customer B. Such provisioning may include attachment circuits connecting NID 707A to the edge router having network address 192.168.51.130 and connecting NID 707B to the edge router having network address 192.168.51.134. At least one provider port of NID 707A couples NID 707A to at least one cable offering connectivity, e.g., as part of an attachment circuit, to network infrastructure 702 and in particular to the edge router having network address 192.168.51.130. At least one provider port of NID 707B couples NID 707B to at least one cable offering connectivity, e.g., as part of an attachment circuit, to network infrastructure 702 and in particular to the edge router having network address 192.168.51.133.

In order to provision end-to-end L3 connectivity between respective L3 autonomous systems of customer A of cage 704A and customer B of cage 704B, in conjunction with provisioning network infrastructure 702, programmable network platform 3 additionally sends configuration data 703 that provisions NIDs 707A, 707B to interconnect the provider ports, to which the layer 3 network of network infrastructure 702 is connected, to the customer ports of the NIDs 707A, 707B to which the customer L2 networks for the corresponding L3 subnets are connected. In the illustrated example, VLAN 718 (associated with VLAN id 500) is a customer L2 network of customer A for a subnet advertised to the L3 autonomous system of infrastructure network 702; and VLAN 710 (associated with VLAN id 500) is a customer L2 network of customer B for a subnet advertised to the L3 autonomous system of infrastructure network 702. Configuration data 703 causes NID 707A to be configured to interconnect a customer port of NIC 707A that is configured with VLAN 718 and a provider port of NIC 707A that is connected to the edge router having network address 192.168.51.130. Configuration data 703 also causes NID 707B to be configured to interconnect a customer port of NIC 707B that is configured with VLAN 710 and a provider port of NIC 707B that is connected to the edge router having network address 192.168.51.133. In this way, programmable network platform 3 may dynamically configure active panels 706 to interconnect, via a layer 3 end-to-end path, different L2 customer networks having corresponding L3 subnets via the infrastructure network 703.

Figure 16:
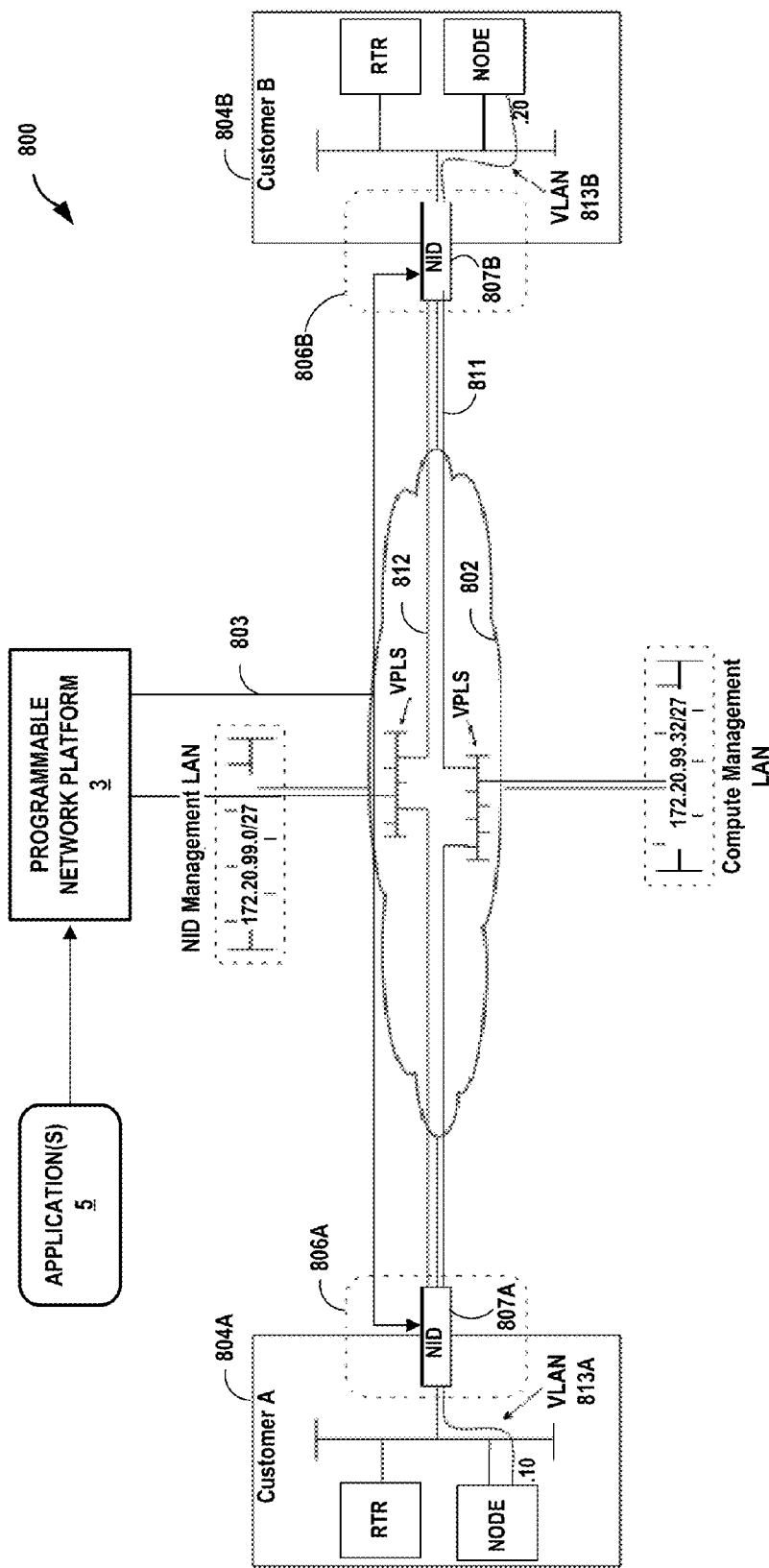
FIG. 16 is a block diagram illustrating a network system having active panels for customer cages in a communication facility, in accordance with techniques described herein.

FIG. 16 is a block diagram illustrating a network system having active panels for customer cages in a communication facility, in accordance with techniques described herein. In this example, NIDs 807A-807B of respective active panels 806A-806B each have at least one provider port connected to a programmable network platform in order to receive configuration data 803. VPLS 812 of network infrastructure 802 is configured to transport data from programmable network platform 3 to NIDs 807A-807B and from NIDs 807A-807B to programmable network platform 3. Programmable network platform 3 may send configuration data 803 via VPLS 812 to NIDs 807A-807B to provision the NIDs to connect at least one provider port to at least one customer port in order to establish connectivity between a customer network located in customer cage 804A and a customer network located in customer cage 804B. In the illustrated example, programmable network platform configures NIDs 807A-807B to connect VLAN 813A to VPLS 811 via NID 807A and to connect VLAN 813B to VPLS 811 via NID 807B.

Figure 17:
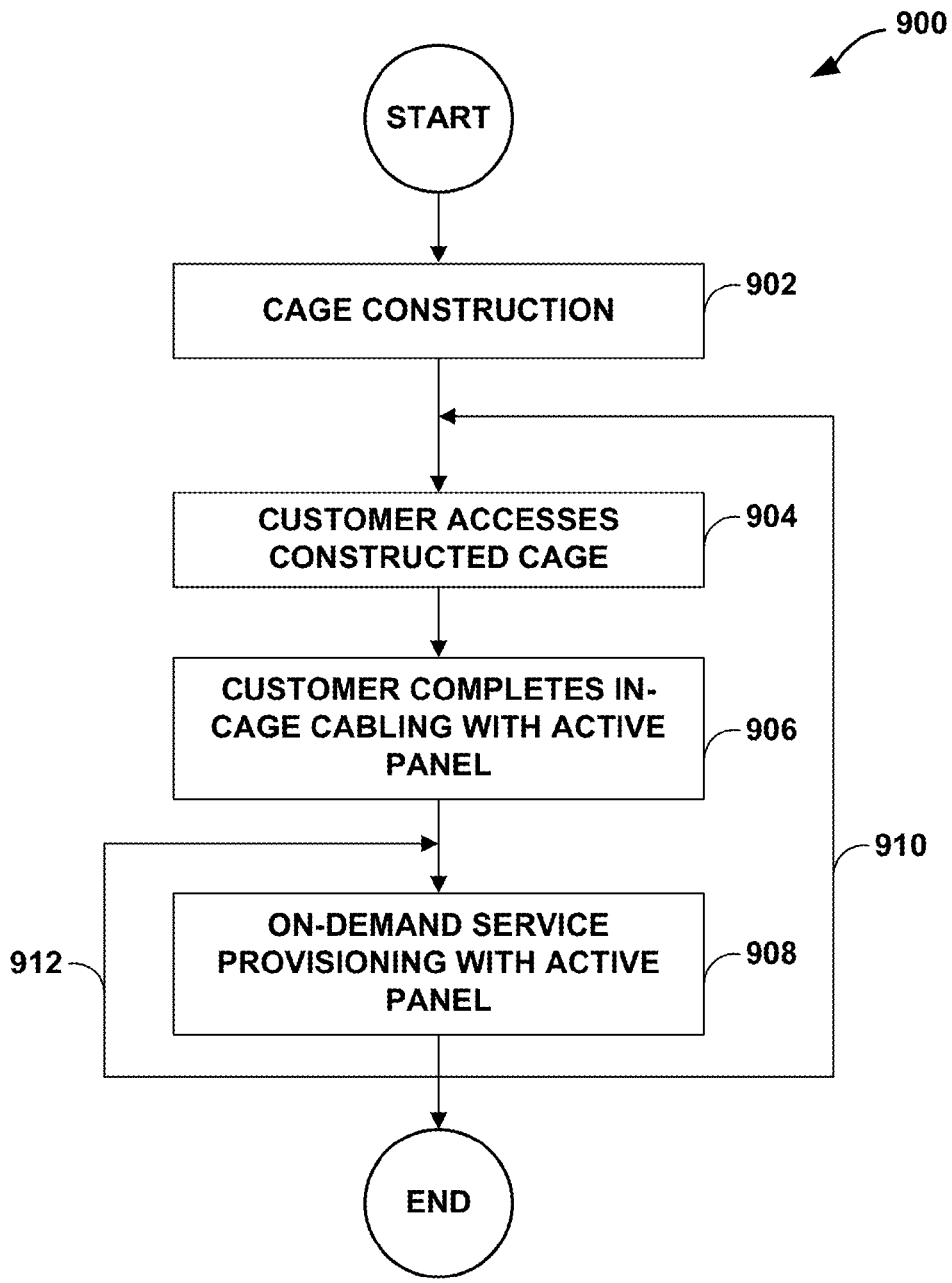
FIG. 17 is a flowchart illustrating an example process for providing on-demand service provisioning with an active panel, in accordance with one or more aspects of the present disclosure.

FIG. 17 is a flowchart illustrating example process 900 for providing on-demand service provisioning with an active panel, in accordance with one or more aspects of the present disclosure. FIG. 17 is described with reference to cage 2 of FIG. 1. However, process 900 may also apply to cage 4 or any other cage of system 1.

An interconnection service provider for a communication facility may construct cage 2 (902). Cage 2 includes active panel 12. Active panel 12 may include network interface device (NID) 6 and configuration interface 18. In some examples, before, during, or after construction of cage 2 with active panel 12, the interconnection service provider may pre-provision NID 6 of active panel 12 with a physical connection to network infrastructure 10. In some examples, before, during, or after construction of cage 2 with active panel 12, the interconnection service provider may connect configuration interface 18 of active panel 12 to PNP 3. In some examples, as part of constructing cage 2, the interconnection service provider may secure cage 2 by allowing access to a tenant customer that leases cage 2 and preventing access to cage 2 to others. For example, as part of the construction of cage 2, the interconnection service provider may install a security system that prevents access to cage 2.

After construction of cage 2, the interconnection service provider may allow for a customer to access cage 2 (904). For example, the interconnection service provider may provide the customer with a key or some other form of security access. Upon granting access to cage 2, the interconnection service provider may also allow for the customer to complete in-cage cabling with active panels 12 of cage 2 (906). For example, the interconnection service provider may provide the customer physical access to customer ports on one side (e.g., the customer side) of active panel 12 of cage 2. In this example, the interconnection service provider may also restrict the customer's physical access to provider ports on another side (e.g., the interconnection service provider side) of active panel 12 of cage 2.

During or after customer completes in-cage cabling with active panel 12, the interconnection service provider may provide on-demand service provisioning with active panel 12 (908). For example, the interconnection service provider may provide on-demand service provisioning via PNP 3 and configuration interface 18 of active panel 12. The customer may request the interconnection service using a customer portal or other application. In other examples, prior to customer completing in-cage cabling with active panel 12, the interconnection service provider may provide predetermined or pre-provisioned service provisioning with active panel 12.

After provisioning active panel 12, the interconnection service provider may allow for the customer to re-access cage 2 to change the in-cage cabling with active panel 12 (910). Similarly, after on-demand service provisioning of active panel 12, the customer may request that the interconnection service provider provide on-demand service re-provisioning of active panel 12 (912). For example, the interconnection service provider may provide on-demand service re-provisioning via PNP 3 and configuration interface 18 of active panel 12.

In this way, an interconnection service provider using technique 900 and cage 2 with active panel 12 may facilitate the pooling of physical resources while abstracting individual active panel port assignments from services, which may permit the virtualization of interconnection services by the interconnection service provider using, e.g., the interconnection platform. In other words, by decoupling the one-to-one or one-to-many dedicated connections between the provider-side and customer-side ports of active panel 12, an interconnection service provider may use active panel 12 to permit the physically pre-provisioned cross-connect infrastructure of the communication facility (representing a pool of interconnect capacity) to be dynamically selected, configured, and used on-demand by the customer(s). For example, individual circuits made available by the interconnection service provider and that are connected to the provider-side ports of active panel 12 may be dynamically 'pooled' or 'aggregated' into higher capacity interconnects or left isolated to provide dedicated capacity via configurable, logical interconnections within active panel 12 to customer-side ports. The interconnection service provider may thus use active panel 12 to improve provisioning speed for interconnects by reducing the need for manual installation or modification of physical cabling, allow the customer to create both physical and logical circuits across the communication facility to providers and provider services of the customer's choosing, and enable dynamic bundling of physical cables to create aggregation groups on demand.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:
1. A cable patch panel comprising:
a software-configurable network interface device having a first side, a second side different than the first side, a switch, and a configuration interface,
the first side comprising a first plurality of network interface ports that, when the cable patch panel is situated in at least one panel of a cage enclosure demarcating a customer area and provider area within a communication facility having an infrastructure network configured to interconnect a plurality of customer networks, are accessible only to a communication facility provider for the communication facility having an infrastructure network configured to interconnect a plurality of customer networks,
the second side comprising a second plurality of network interface ports that, when the cable patch panel is situated in the at least one panel of the cage enclosure demarcating the customer area and provider area, are accessible only to a customer of the communication facility provider, and
the configuration interface configured to, in response to receiving configuration data defining a connection between at least one port of the first plurality of network interface ports and at least one port of the second plurality of network interface ports, configure the switch to create the connection between the at least one port of the first plurality of network interface ports and the at least one port of the second plurality of network interface ports.

2. The cable patch panel of claim 1,
wherein the first plurality of network interface ports comprises at least one Ethernet port and at least one optical port, and
wherein the second plurality of network interface ports comprises at least one Ethernet port and at least one optical port.

3. The cable patch panel of claim 1,
wherein the first plurality of network interface ports comprises at least one pass-through port having a static connection to at least one of the second plurality of network interface ports.

4. The cable patch panel of claim 1,
wherein the configuration data defines a connection between multiple ports of the first plurality of network interface ports and a port of the second plurality of network interface ports, and
wherein to create the connection the configuration interface is configured to configure the switch to connect the multiple ports of the first plurality of network interface ports and the port of the second plurality of network interface ports.

5. The cable patch panel of claim 1,
wherein the configuration data defines a port of the second plurality of network interface ports as associated with a second virtual network and defines a port of the first plurality of network interface ports as associated with a first virtual network, and
wherein to create the connection the configuration interface is configured to configure the switch to forward packets received via the second virtual network to the first virtual network.

6. The cable patch panel of claim 5, wherein the second virtual network comprises a customer virtual local area network (VLAN) and the first virtual network comprises one of a provider VLAN and a provider VxLAN.

7. The cable patch panel of claim 1,
wherein the switch comprises an optical switch,
wherein to create the connection the configuration interface is configured to configure the optical switch to establish a transmission path for optical signals between the at least one port of the first plurality of network interface ports and the at least one port of the second plurality of network interface ports.

8. The cable patch panel of claim 7, wherein the optical switch comprises a photonic switch.

9. The cable patch panel of claim 1, wherein an access panel of the cable patch panel includes a security device that prevents access to the first plurality of network interface ports to all parties other than the communication facility provider.

10. The cable patch panel of claim 1, wherein a port of the first plurality of network interface ports receives, from a programmable network platform for the communication facility, the configuration data.

11. The cable patch panel of claim 1,
wherein the at least one port of the second plurality of network interface ports are coupled to a customer network for the customer, and
wherein the connection between the at least one port of the first plurality of network interface ports and the at least one port of the second plurality of network interface ports is part of a virtual circuit between the customer network and another customer network.

12. The cable patch panel of claim 1,
wherein the configuration data defines a connection between multiple ports of the first plurality of network interface ports and a port of the second plurality of network interface ports, and
wherein to create the connection the configuration interface is configured to configure the switch to connect the multiple ports of the first plurality of network interface ports and the port of the second plurality of network interface ports,
wherein multiple cables connected to the multiple ports of the first plurality of network interface ports include an aggregate pool of interconnection capacity through the communication facility coupled to the cable patch panel and available for uplink traffic sourced by a customer network connected to the port of the second plurality of network interface ports.

13. A cage structure of a communication facility, the cage structure comprising:
a cage enclosure having at least one panel demarcating a customer area and a provider area, the cage enclosure enclosing the customer area accessible only to a customer of the communication facility provider; and
a cable patch panel situated within the at least one panel comprising:
a software-configurable network interface device having a first side, a second side different than the first side, a switch, and a configuration interface,
the first side comprising a first plurality of network interface ports accessible only to a communication facility provider for a communication facility having an infrastructure network configured to interconnect a plurality of customer networks, and
the second side comprising a second plurality of network interface ports accessible only to the customer of the communication facility provider having access to the area enclosed by the cage enclosure, and
the configuration interface configured to, in response to receiving configuration data defining a connection between at least one port of the first plurality of network interface ports and at least one port of the second plurality of network interface ports, configure the switch to create the connection between the at least one port of the first plurality of network interface ports and the at least one port of the second plurality of network interface ports.

14. A method comprising:
receiving, by a configuration interface of a software-configurable network interface device of a cable patch panel, configuration data defining a connection between at least one port of the first plurality of network interface ports and at least one port of the second plurality of network interface ports,
wherein the software-configurable network interface device includes a first side, a second side different than the first side, and a switch,
wherein the first side comprises a first plurality of network interface ports accessible only to a communication facility provider for a communication facility having an infrastructure network configured to interconnect a plurality of customer networks, and
wherein the second side comprises a second plurality of network interface ports accessible only to a customer of the communication facility provider,
configuring, by the configuration interface in response to the receiving, the switch to create the connection between the at least one port of the first plurality of network interface ports and the at least one port of the second plurality of network interface ports.

15. The method of claim 14,
wherein the first plurality of network interface ports comprises at least one Ethernet port and at least one optical port, and
wherein the second plurality of network interface ports comprises at least one Ethernet port and at least one optical port.

16. The method of claim 14,
wherein the first plurality of network interface ports comprises at least one pass-through port having a static connection to at least one of the second plurality of network interface ports.

17. The method of claim 14,
wherein the configuration data defines a connection between multiple ports of the first plurality of network interface ports and a port of the second plurality of network interface ports, and
wherein to create the connection the configuration interface configures the switch to connect the multiple ports of the first plurality of network interface ports and the port of the second plurality of network interface ports.

18. The method of claim 14,
wherein the configuration data defines a port of the second plurality of network interface ports as associated with a second virtual network and defines a port of the first plurality of network interface ports as associated with a first virtual network, and
wherein to create the connection the configuration interface configures the switch to forward packets received via the second virtual network to the first virtual network.

19. The method of claim 18, wherein the second virtual network comprises a customer virtual local area network (VLAN) and the first virtual network comprises one of a provider VLAN and a provider VxLAN.

20. The method of claim 14,
wherein the switch comprises an optical switch,
wherein to create the connection the configuration interface configures the optical switch to establish a transmission path for optical signals between the at least one port of the first plurality of network interface ports and the at least one port of the second plurality of network interface ports.

21. The method of claim 20, wherein the optical switch comprises a photonic switch.

22. The method of claim 14, wherein an access panel of the cable patch panel includes a security device that prevents access to the first plurality of network interface ports to all parties other than the communication facility provider.

23. The method of claim 14, wherein a port of the first plurality of network interface ports receives, from a programmable network platform for the communication facility, the configuration data.

24. The method of claim 14,
wherein the at least one port of the second plurality of network interface ports are coupled to a customer network for the customer, and
wherein the connection between the at least one port of the first plurality of network interface ports and the at least one port of the second plurality of network interface ports is part of a virtual circuit between the customer network and another customer network.

25. The method of claim 14,
wherein the configuration data defines a connection between multiple ports of the first plurality of network interface ports and a port of the second plurality of network interface ports,
wherein to create the connection the configuration interface configures the switch to connect the multiple ports of the first plurality of network interface ports and the port of the second plurality of network interface ports, and
wherein multiple cables connected to the multiple ports of the first plurality of network interface ports include an aggregate pool of interconnection capacity through the communication facility coupled to the cable patch panel and available for uplink traffic sourced by a customer network connected to the port of the second plurality of network interface ports.

26. The method of claim 25, further comprising:
pre-provisioning interconnect capacity in the communication facility in part by connecting, by the communication facility provider, the multiple cables to the multiple ports of the first plurality of network interface ports.

* * * * *